United States Patent
Gupta et al.

(10) Patent No.: US 10,947,067 B1
(45) Date of Patent: Mar. 16, 2021

(54) TOTE STACKER MACHINE

(71) Applicant: Amazon Technologies, Inc., Seattle, WA (US)

(72) Inventors: Shelly Gupta, Seattle, WA (US); Adam C. Barlow, North Bend, WA (US); Terrick Willoughby, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/706,203

(22) Filed: Dec. 6, 2019

(51) Int. Cl.
  *B65G 57/16*  (2006.01)
  *B65G 57/03*  (2006.01)
  *B65G 47/24*  (2006.01)
  *B65G 47/91*  (2006.01)

(52) U.S. Cl.
  CPC .......... *B65G 57/165* (2013.01); *B65G 47/24* (2013.01); *B65G 47/917* (2013.01); *B65G 57/035* (2013.01); *B65G 2201/0258* (2013.01); *B65G 2203/0225* (2013.01); *B65G 2203/044* (2013.01)

(58) Field of Classification Search
  CPC .... B65G 57/035; B65G 47/24; B65G 47/917; B65G 57/165; B65G 2201/0258; B65G 2203/0225; B65G 2203/044
  See application file for complete search history.

(56) References Cited

U.S. PATENT DOCUMENTS

| | | | | |
|---|---|---|---|---|
| 3,388,817 A | * | 6/1968 | Johnson | B65G 59/062 414/795.8 |
| 3,533,517 A | * | 10/1970 | Heide | B65G 37/00 414/790 |
| 4,648,233 A | * | 3/1987 | Holland | B65B 5/04 414/792.9 |
| 4,692,876 A | * | 9/1987 | Tenma | B65G 1/1371 414/791.6 |
| 7,210,894 B2 | * | 5/2007 | Huang | B65G 47/90 414/21 |
| 2018/0022557 A1 | * | 1/2018 | Tanaka | B65G 61/00 53/500 |

FOREIGN PATENT DOCUMENTS

DE                4017692 A1 * 12/1991 ............. B65B 35/50

* cited by examiner

*Primary Examiner* — Gregory W Adams
(74) *Attorney, Agent, or Firm* — Eversheds Sutherland (US) LLP

(57) ABSTRACT

Devices, systems, and methods are provided for a tote stacker machine. A tote stacker system may include a first conveyor belt, a sensor to determine an orientation of a first tote on the first conveyor belt, an end effector that moves in a lateral direction between a first position aligned with the first conveyor belt and a second position, and an elevator that is aligned with the second position and that includes a first track and a second track. The elevator may receive the first tote from the end effector and may down stack the first tote with a second tote. The tote stacker system may include a second conveyor belt at least partially positioned between the first track and the second track of the elevator, and the second conveyor may move the first tote and second tote away from the elevator.

19 Claims, 17 Drawing Sheets

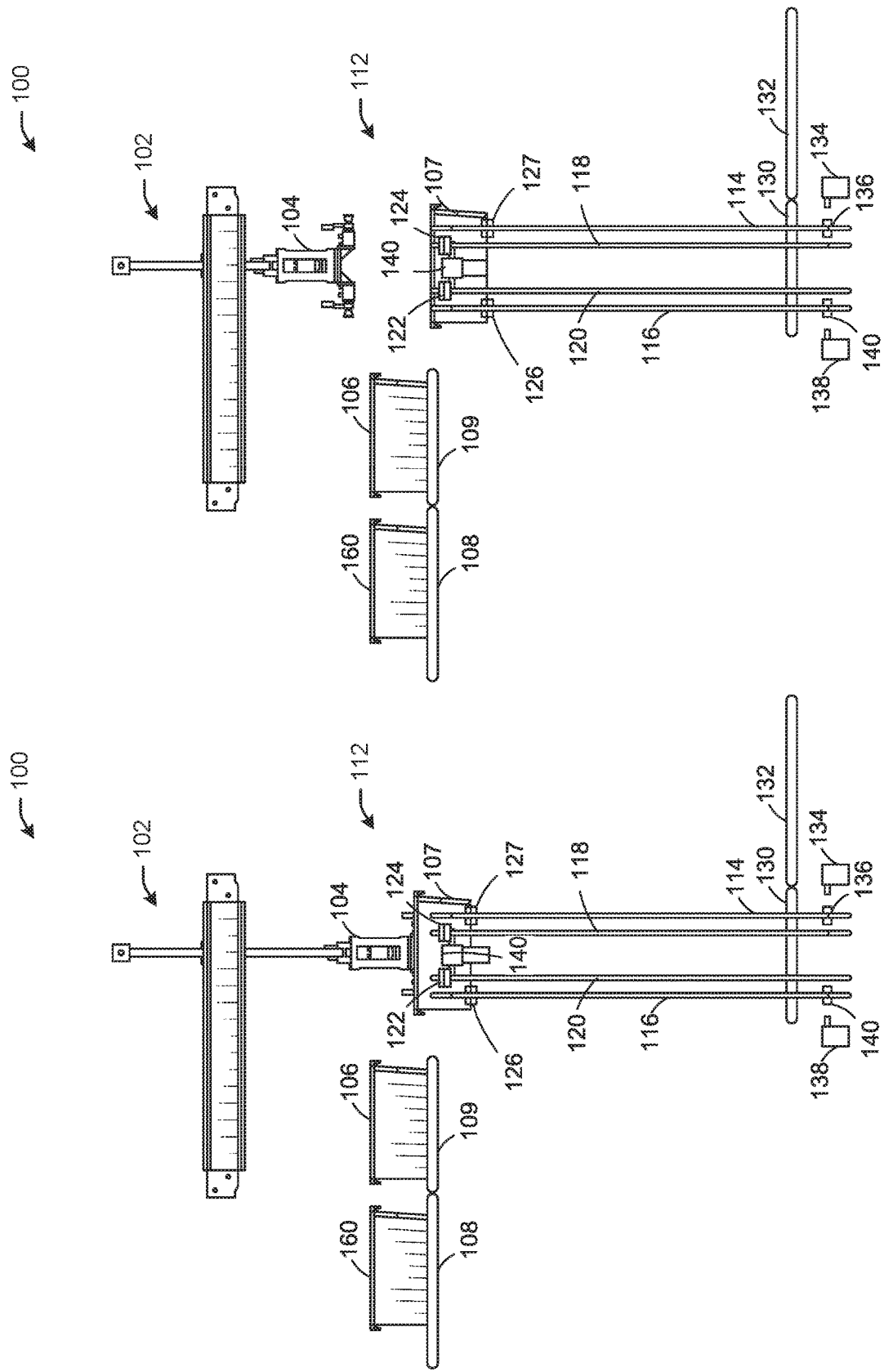

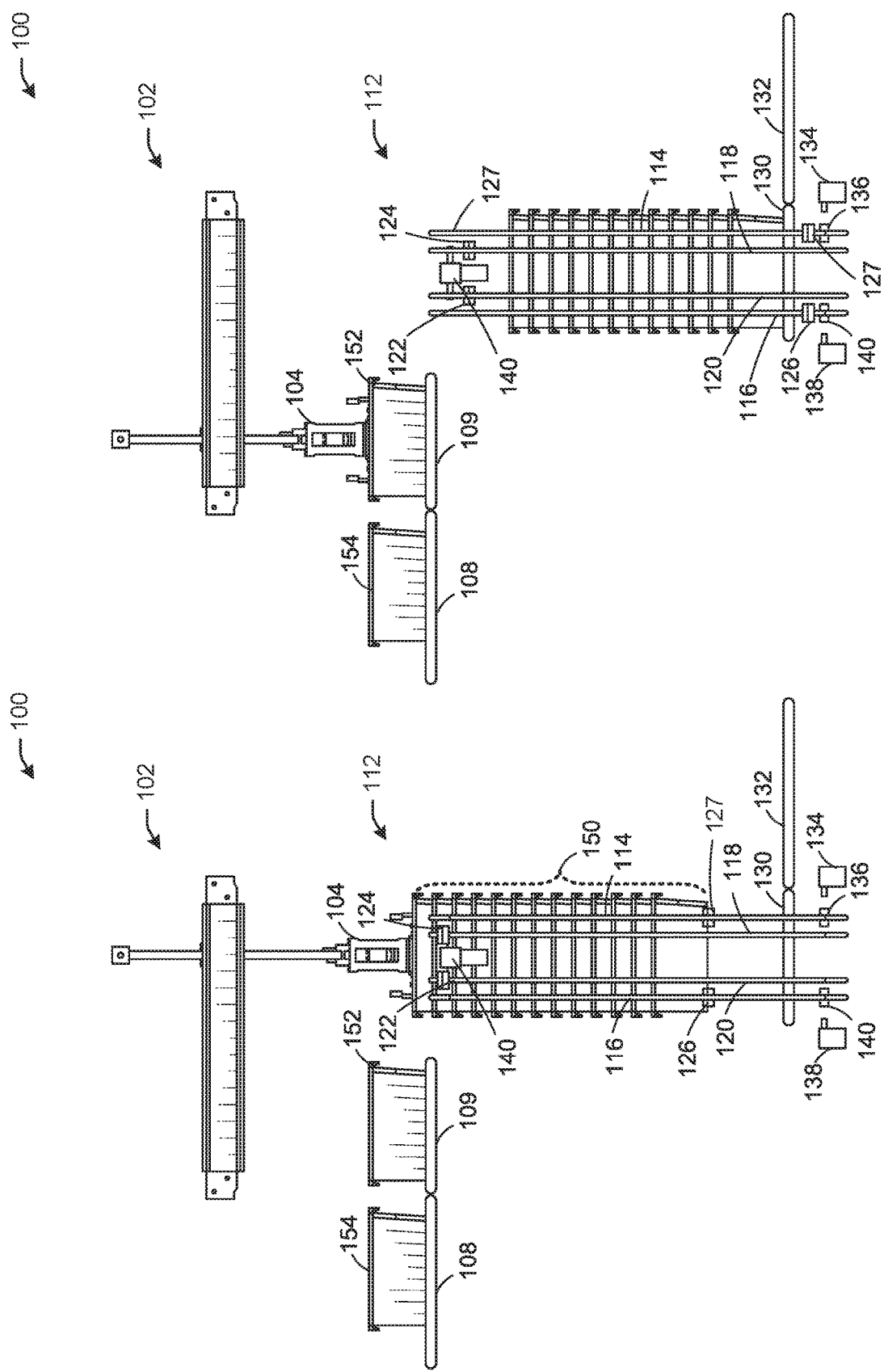

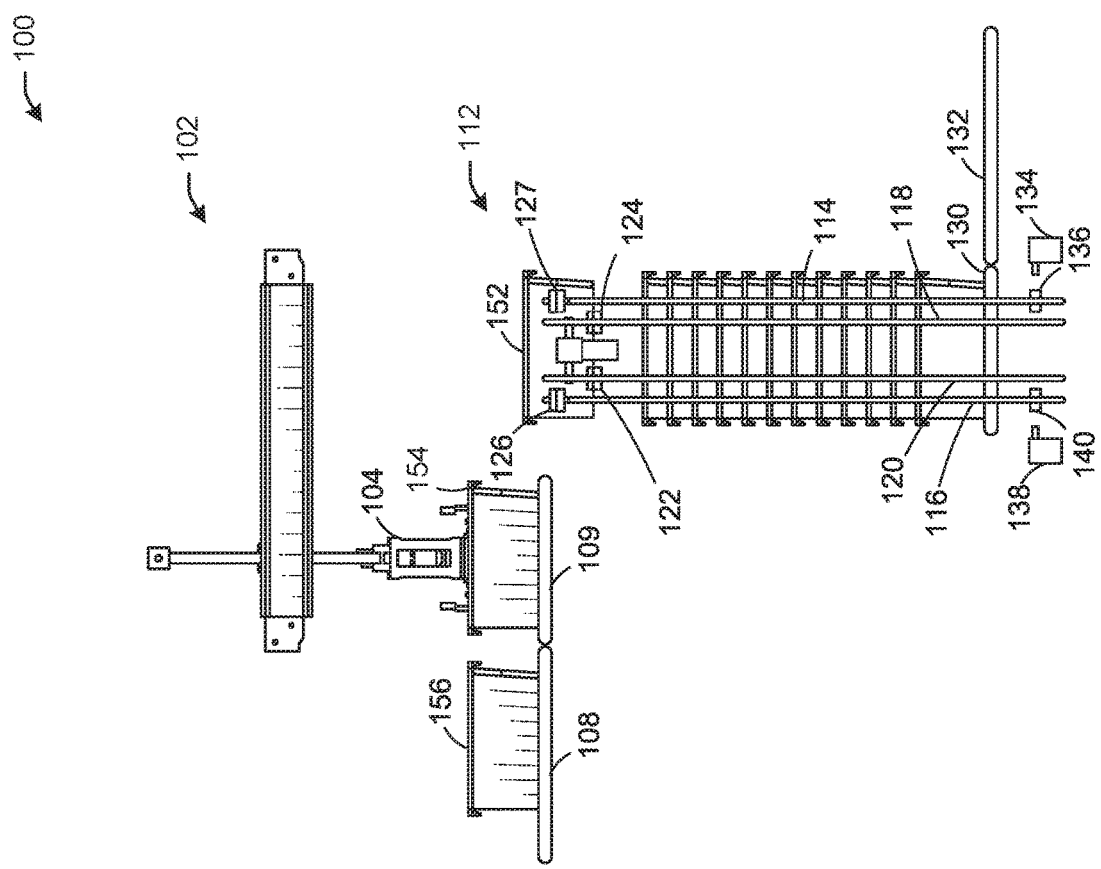
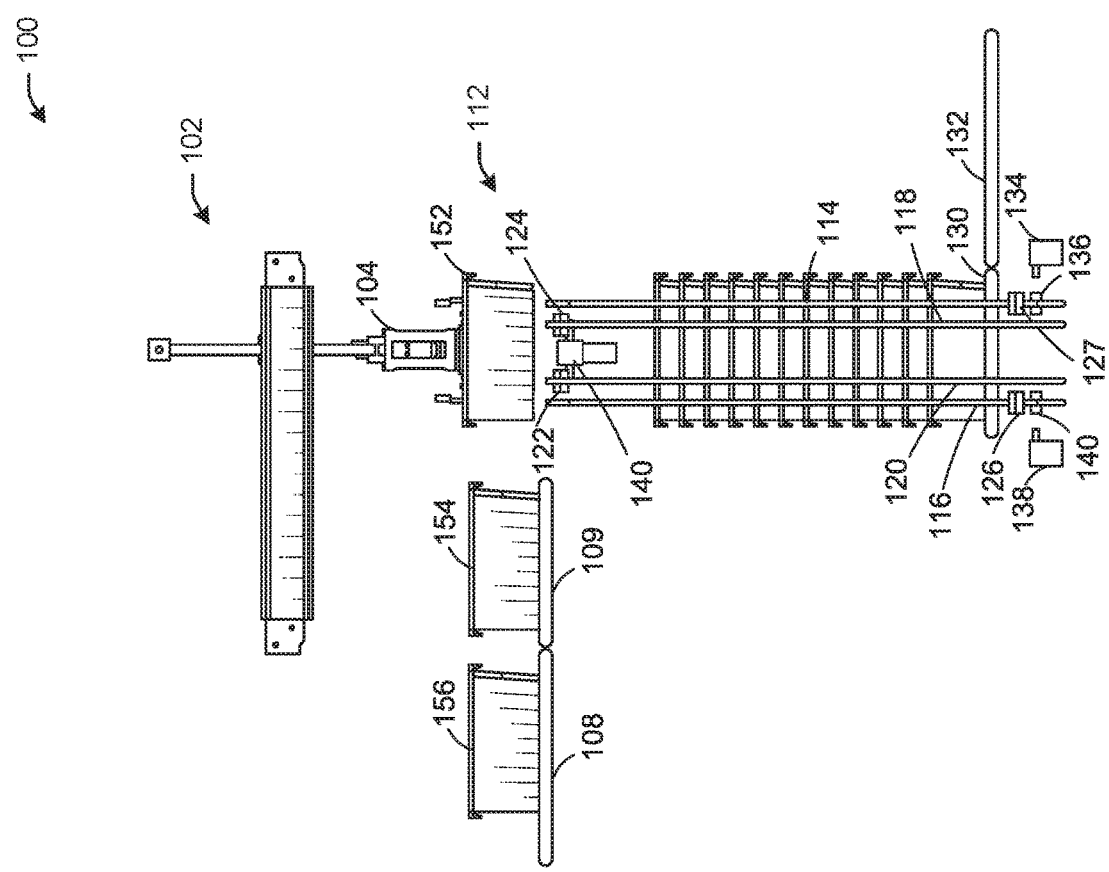

TOTE STACKER MACHINE

BACKGROUND

Industrial machines are used in a variety of settings and can require significant physical space and time for their operation. Automation of tasks such as organizing containers may require large equipment that may not be efficient. Machines used to stack tote containers may be too large and may operate too slowly for time and cost efficient operations.

BRIEF DESCRIPTION OF THE DRAWINGS

FIG. 3E illustrates an operation of the tote stacker machine of FIG. 1, in accordance with one or more example embodiments of the present disclosure.

FIG. 3F illustrates an operation of the tote stacker machine of FIG. 1, in accordance with one or more example embodiments of the present disclosure.

FIG. 3G illustrates an operation of the tote stacker machine of FIG. 1, in accordance with one or more example embodiments of the present disclosure.

FIG. 3H illustrates an operation of the tote stacker machine of FIG. 1, in accordance with one or more example embodiments of the present disclosure.

FIG. 3I illustrates an operation of the tote stacker machine of FIG. 1, in accordance with one or more example embodiments of the present disclosure.

FIG. 3J illustrates an operation of the tote stacker machine of FIG. 1, in accordance with one or more example embodiments of the present disclosure.

Figure 1:
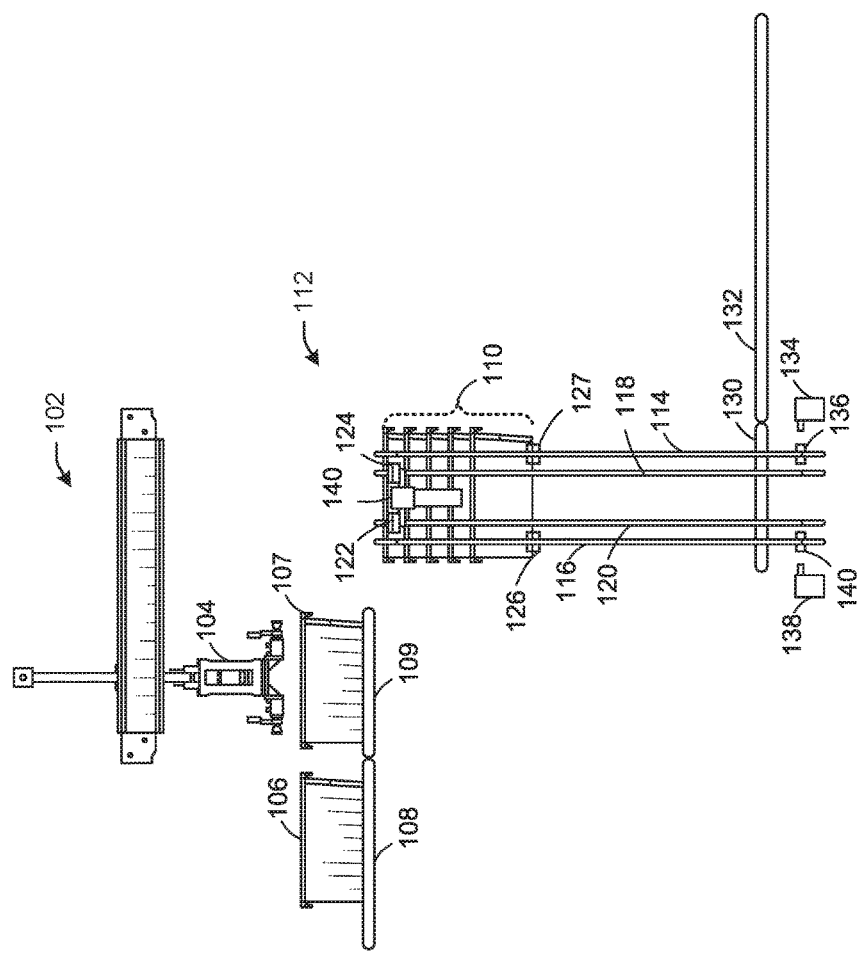
FIG. 1 illustrates an example tote stacker machine in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain elements of a tote stacker machine and its use.

Tote containers (also referred to herein as "totes") may be used for a variety of purposes, such as transporting and storing items. For example, totes may be twenty feet or more in length and fifteen feet or more in width, thus requiring significant physical space when many totes are used in an environment such as a warehouse. To efficiently organize and store totes, automated machines may generate stacks of totes. Some existing tote stacker machines may be slow and may require a significant amount of space.

For example, some tote stacker machines may require that a stack of totes passes through the machine before another stack of totes may be generated, and some tote stacker machines may require multiple stations for determining the orientation of a tote, and positioning a tote to be gripped and lifted. In particular, some tote stacker machines may use a rotating table to orient a tote so that the tote is in the proper location and position to be gripped and lifted by a mechanism that transports the tote to a location where totes are stacked. Some tote stacker machines generate a stack of totes using up-stacking and then transfer the stack to an elevator, which lowers the stack to a conveyor that provides an outfeed of the stack from the elevator. Some tote stacker machines lack the ability to adjust the number of totes to use in a stack.

When totes are not oriented or stacked properly, a tote stacker machine may fail and require human operator intervention. Downtime and maintenance of tote stacker machines may be expensive and may result in fewer totes being stacked in a given time period. Therefore, automated tote stacking machines may be improved to stack more totes in a shorter amount of time using less physical space and reducing errors that result in downtime and maintenance.

In one or more embodiments, a tote stacker machine include an infeed bed for totes, which may refer to a flat belt conveyor to feed a tote into a tote pick-up area. The tote stacker machine may include a high-speed dual servo t-bot to pick up totes and place the totes into an elevator to form a stack of totes within the elevator. The t-bot may include a self-centering pneumatic end effector to grip and lift totes and to rotate totes (e.g., using a servo-actuated rotator) from one orientation to another based on data detected by one or more laser sensors (e.g., Keyence laser sensors or other types of laser sensors). The tote stacker machine may include a vertical indexing elevator for receiving totes such that any tote may be down stacked with another tote in the elevator, and the elevator may lower a stack of totes when the stack reaches a certain number of totes that may be an adjustable number. The elevator may lower a stack onto an exit conveyor that is below the infeed bed, and the exit conveyor may move to transport a stack from within the elevator to a location outside of the elevator (e.g., an outfeed). To contain totes within the elevator, the elevator may use pneumatic tote guides, which may be bars that prevent totes from exiting the elevator when at a first position (e.g., similar to bars of a cage), and which may move to a second position (e.g., two bars moving away from one another to create a gap in the cage) to allow a stack of totes to exit the elevator on the exit conveyor.

In one or more embodiments, the end effector may be operatively connected to the t-bot (e.g., a t-bot gantry) to allow the end effector to move along a lateral axis (e.g., corresponding to the length of the t-bot). For example, in one lateral position, the end effector may be positioned above a tote that is positioned on the infeed bed. A sensor of the end effector or elsewhere on the tote stacker machine may detect sensor data indicating the location, position, and/or orientation of the tote (e.g., whether the tote is in position to be picked up and stacked or needs to be rotated to fit within another tote to form a stack). The end effector may include extendable arms that may have vacuum suction grippers. The end effector may lower from one height above a tote on the infeed bed to a lower height at least partially within the tote. The arms of the end effector may extend laterally toward the inner walls of the tote, and using vacuum suction of the grippers, may grip the inner walls of the tote (e.g., using a cubic feet per minute air flow). The end effector may lift the tote from the infeed bed and may rotate the tote (e.g., 180 degrees), if necessary for stacking, and may move laterally to another position of the gantry so that the end effector is above the elevator. The end effector may lower the tote into the elevator and may release the tote within the elevator by deactivating the suction grippers and/or returning the arms of the end effector to their non-extended positions. The end effector may return to the first location respective to the gantry to pick up another tote.

In one or more embodiments, the elevator may include multiple tracks (e.g., chains or belts that rotate around pulleys using servo-motor or other rotating means). For example, the elevator may have two sets of four tracks—two sets of two tracks on one side of the tote stacker machine, and two sets of two tracks on an opposite side of the tote stacker machine. The four tracks on a respective side of the tote stacker machine may be arranged next to one another, with the two outer tracks operating in sync with one another, and the two inner tracks operating in sync with one another (but independently from the two outer tracks). The two inner tracks on one side of the tote stacker machine may operate in conjunction with the two inner tracks of the four tracks on the opposite side of the machine, and the two outer tracks on one side of the tote stacker machine may operate in conjunction with one the two outer tracks on the opposite side of the tote stacker machine. In this manner, the sets of two outer tracks on the opposite sides of the tote stacker machine may move at the same time to lower a stack of totes, and the two inner tracks on the opposite sides of the tote stacker machine may move at the same time to lower a stack of totes.

In one or more embodiments, to allow totes to be received and stacked with the tracks of the elevator, a track may be operatively connected to a support platform (e.g., a step onto which a tote may be placed). By maintaining the height of the support platforms on the inner tracks on one side of the tote stacker machine with the height of the support platforms on the inner tracks on the other side of the tote stacker machine, the inner tracks may receive and lower a stack of totes. By maintaining the height of the support platforms on the outer tracks on one side of the tote stacker machine with the height of the support platforms on the outer tracks on the other side of the tote stacker machine, the outer tracks may receive and lower a stack of totes. The tracks may use any combination of belts and pulleys (e.g., any track may include a set of pulleys—an upper pulley and a lower pulley—around which a chain or belt may rotate to adjust the height of a respective support platform). When the support platforms of the inner tracks are being used to generate and lower a stack of totes, the support platforms of the outer tracks may be rotating from the bottom of the elevator (e.g., after lowering a stack of totes) back to the top of the elevator so that when the support platforms of the inner tracks lowers a stack onto the exit conveyor, the support platforms of the outer tracks may be rotated back to the top and inside of the elevator to receive a next stack of totes. When the support platforms of the outer tracks are being used to generate and lower a stack of totes, the support platforms of the inner tracks may be rotating from the bottom of the elevator (e.g., after lowering a stack of totes) back to the top of the elevator so that when the support platforms of the outer tracks lowers a stack onto the exit conveyor, the support platforms of the inner tracks may be rotated back to the top and inside of the elevator to receive a next stack of totes. In this manner, totes may be lowered and ejected from the elevator while a next stack of totes is generated, thereby increasing the number of totes that may be stacked in a given amount of time.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example tote stacker machine 100 in accordance with one or more example embodiments of the present disclosure.

Referring to FIG. 1, the tote stacker machine 100 may include a t-bot 102 (e.g., a dual servo t-bot gantry) operatively connected to an end effector 104 (e.g., a pneumatic end effector with a servo actuated rotator to rotate the end effector 104), which may grip and lift tote containers (e.g., tote 106, tote 107) as further discussed below with respect to FIG. 6A, FIG. 6B, FIG. 6C, and FIG. 6D. The tote containers may approach the end effector 104 using conveyor belts (e.g., conveyor belt 108, conveyor belt 109), from which the end effector 104 may grip and lift the totes (e.g., from a first position on the conveyor belt 109), and may move the totes to a stack 110 in a second position that is within an elevator 112. The elevator 112 may down stack the totes to generate the stack 110 from the end proximate the top of the elevator 112 toward an end proximate the bottom of the elevator 112 until the stack 110 reaches a threshold number of totes.

Still referring to FIG. 1, the elevator 112 may include tracks (e.g., track 114, track 116, track 118, track 120), which may correspond to tracks on the other side of the tote stacker machine 100 (e.g., a track may be behind the track 114 on the page; a track may be behind the track 116 on the page; a track may be behind the track 118 on the page; a track may be behind the track 120 on the page—not shown). The tracks may be operatively connected to support platforms (e.g., support platform 122, support platform 124, support platform 126, support platform 127). The support platform 122 may be operatively connected to a belt or chain (not shown) of the track 120. The support platform 124 may be operatively connected to a belt or chain (not shown) of the track 118. The support platform 126 may be operatively connected to a belt or chain (not shown) of the track 116. The support platform 127 may be operatively connected to a belt or chain (not shown) of the track 114. The support platform 122 and the support platform 124 may remain at the same respective height as one another (e.g., the track 118 and the track 120 may move in conjunction with one another). The support platform 126 and the support platform 127 may remain at the same respective height as on another (e.g., the track 114 and the track 116 may move in conjunction with one another). As shown, the support platform 126 and the support platform 127 may be used to support and lower the stack 110 while the support platform 122 and the support platform 124 are outside of the elevator (e.g., facing outward on the page).

As shown in FIG. 1, the tote stacker machine 100 may include a first exit conveyor belt 130 and a second exit conveyor belt 132 (a second conveyer belt or an exit conveyer belt) proximate the bottom of the elevator 112. The elevator 112 may use the tracks and support platforms to lower totes (e.g., the elevator 112 may rotate the track 114 using a motor 134 that drives a pulley 136 around which the track 114 rotates to adjust the height of the support platform 127, and may rotate the track 116 using a motor 138 to drive a pulley 140 around which the track 116 rotates to adjust the height of the support platform 126). The rotation of the track 116 and the track 114 may lower the support platform 126 and the support platform 127 to allow the stack 110 to be lowered onto the first exit conveyor belt 130, which may move (e.g., using a pneumatic rolling system) to cause the stack 110 to be ejected from the elevator 112 onto the second exit conveyor belt 132. The conveyor belt 108, the conveyor belt 109, the first exit conveyor belt 130, and the second exit conveyor belt 132 may use pneumatic rolling systems to cause the totes to move laterally.

Figure 2A:
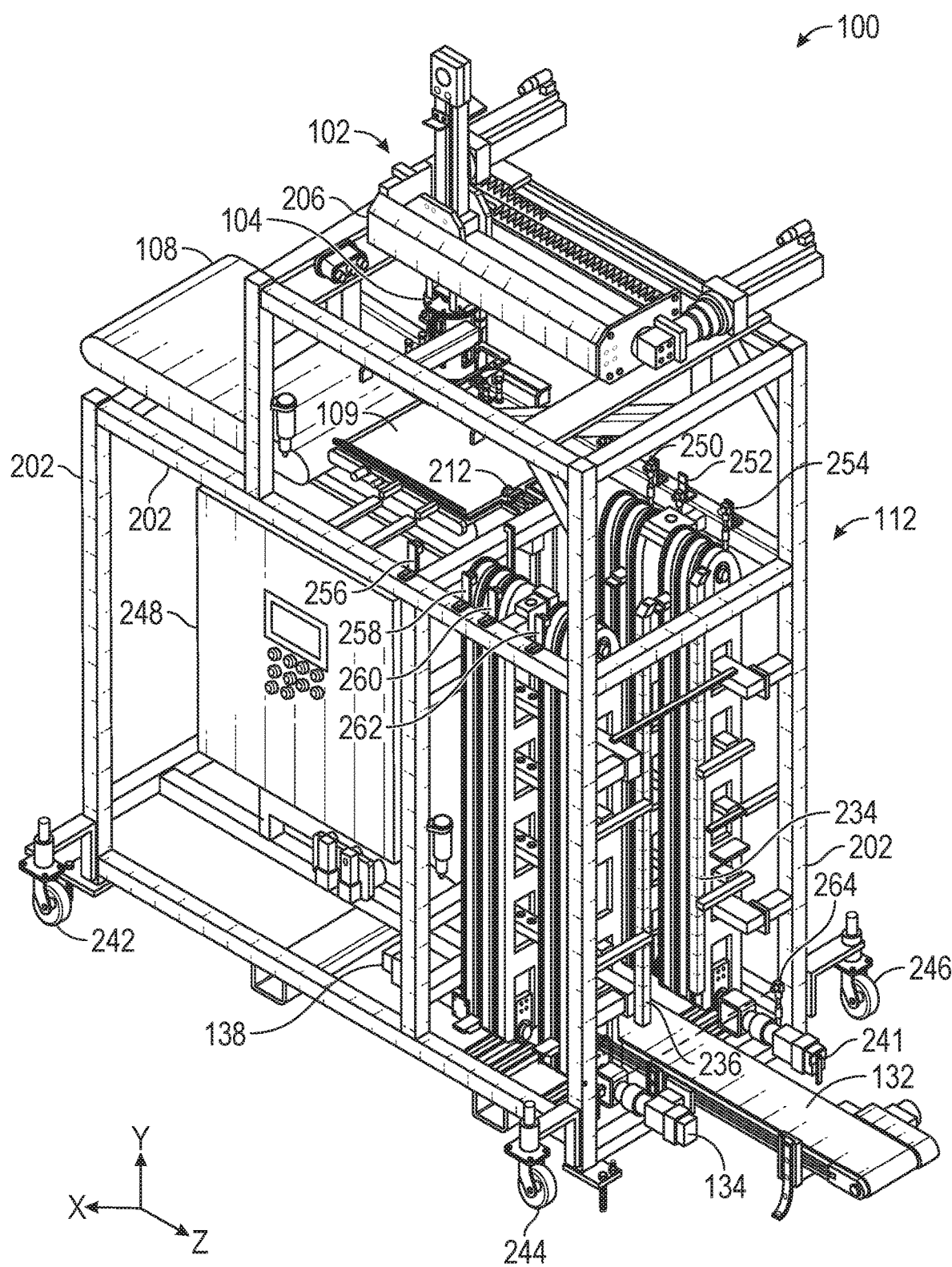
FIG. 2A illustrates a perspective view of the tote stacker machine of FIG. 1, in accordance with one or more example embodiments of the present disclosure.

FIG. 2A illustrates a perspective view of the tote stacker machine 100 of FIG. 1, in accordance with one or more example embodiments of the present disclosure.

Figure 4A:
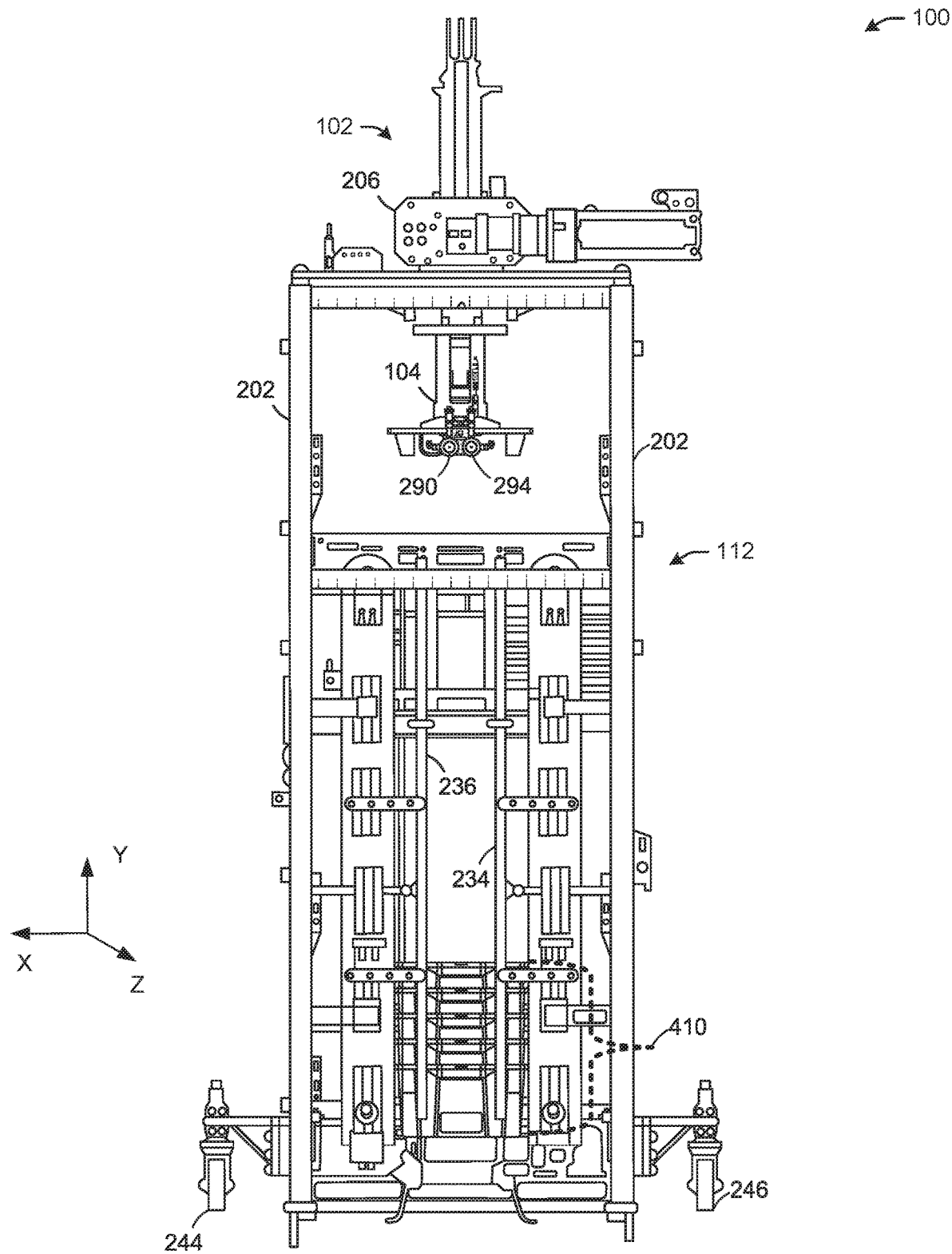
FIG. 4A illustrates a front view of the tote stacker machine of FIG. 1, in accordance with one or more example embodiments of the present disclosure.
Figure 4B:
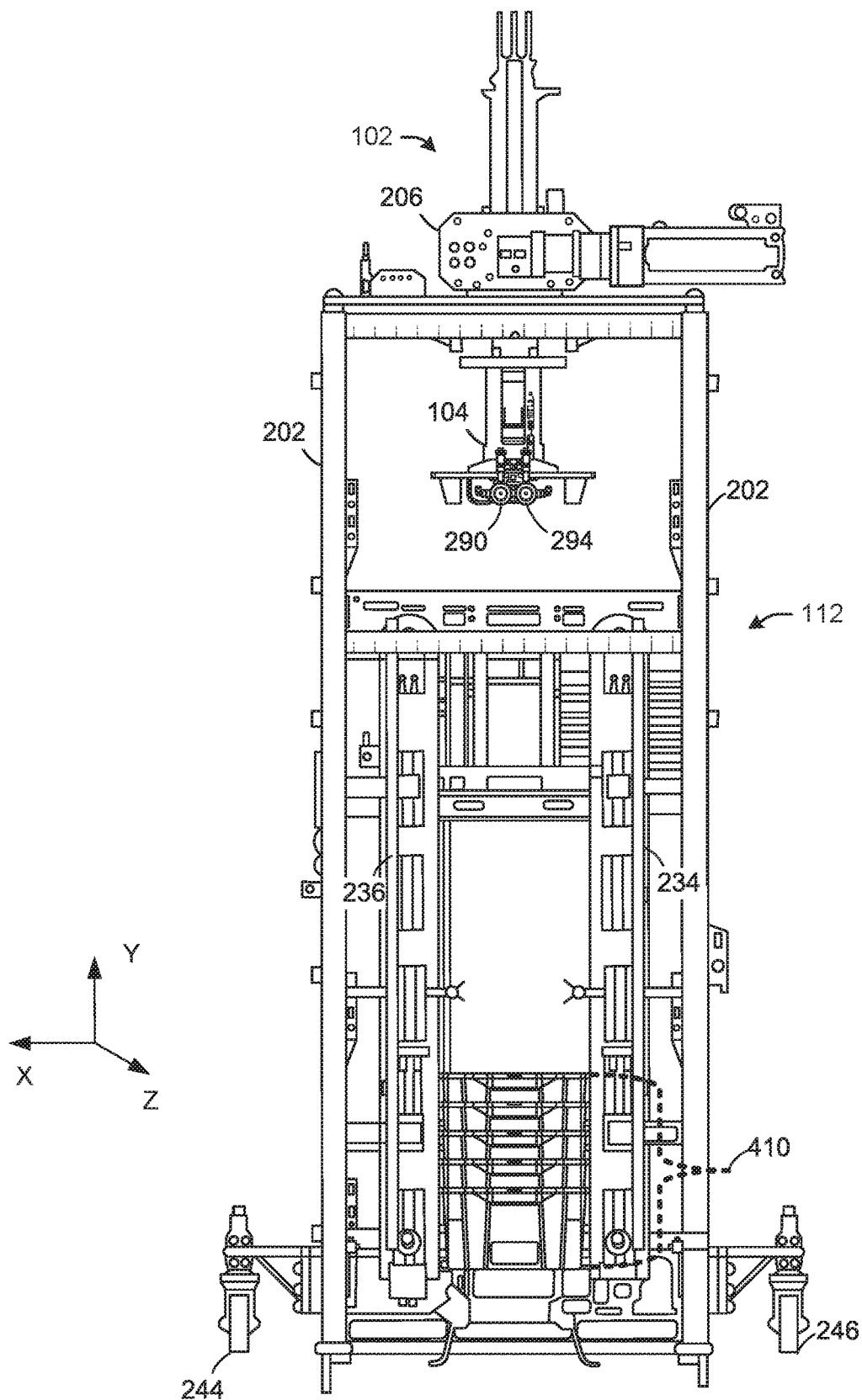
FIG. 4B illustrates a front view of the tote stacker machine of FIG. 1, in accordance with one or more example embodiments of the present disclosure.

Referring to FIG. 2A, the perspective view of the tote stacker machine 100 shows the t-bot 102, the end effector 104, the conveyor belt 108, the conveyor belt 109, the elevator 112, the second exit conveyor belt 132, the motor 134, and the motor 138 of FIG. 1. The perspective view of the tote stacker machine 100 also shows a frame 202 that supports the tote stacker machine 100, a gantry 206 of the t-bot 102, and a stopper 212 (e.g., a vacuum stopper) to stop and position totes (e.g., the tote 107 of FIG. 1) on the conveyor belt 109 using vacuum suction, Still referring to FIG. 2A, the perspective view of the tote stacker machine 100 shows a tote guide 232 and a tote guide 234, which may be bars arranged vertically (e.g., parallel to the tracks and perpendicular to the second exit conveyor 132). When the tote guide 232 and the tote guide 234 are in a first position as shown, totes may not exit the elevator 112 because the distance between the tote guide 232 and the tote guide 234 may not be wide enough to permit totes to pass in between them. As shown in FIG. 4A and FIG. 4B, however, the tote guide 232 and the tote guide 234 may move to a second position that allows totes to exit the elevator 112. The tote stacker machine 100 also may include wheels (e.g., wheel 242, wheel 244, wheel 246, and another wheel in the upper right corner of the bottom of the frame 202 that is not shown in FIG. 2A). The wheels may allow the tote stacker machine 100 to be portable in any setting. The tote stacker machine 100 may include a control panel 248 (which can be on the opposite side of the tote stacker machine 100 than the side shown in FIG. 2A) to control operation of the tote stacker machine 100 (e.g., by receiving inputs to activate/deactivate the tote stacker machine 100, to adjust the number of totes in a stack, to change operation speeds, to enter error detection modes, etc.). The tote stacker machine 100 also may include sensors (e.g., sensor 250, sensor 252, sensor 254, sensor 256, sensor 258, sensor 260, sensor 262, sensor 264). The sensors may determine whether totes are in the correct position (e.g., given the number of totes in the elevator 112, the sensors may detect sensor data indicating whether the expected height of a stack of the number of totes exceeds a height threshold, in which case the tote stacker machine 100 may enter a fault mode to adjust the totes. The sensor 264 may detect sensor data indicating whether totes have cleared the elevator 112 when ejected, allowing the tote guide 234 and the tote guide 236 to "close" in the first position. In one or more embodiments, the end effector 104 may move along the z-axis (e.g., a lateral axis) parallel to the gantry 206 from a first position above the conveyor belt 109 to a second position above the elevator 112 to generate stacks of totes (e.g., the stack 110 of FIG. 1). Any time that the end effector 104 transports a tote from the conveyor belt 109 to the elevator 112, the tote stacker machine 100 may increment a count indicative of a number of totes in a stack. When the number of totes in a stack exceeds an adjustable number of totes (e.g., a tote threshold), the elevator 112 may lower and eject a stack of totes while beginning another stack. Alternatively, the sensors may detect sensor data indicating the height or weight of a stack, and based on the height or weight exceeding one or more thresholds, the elevator 112 may lower and eject a stack that has reached a height and/or weight limit for a stack.

Figure 2B:
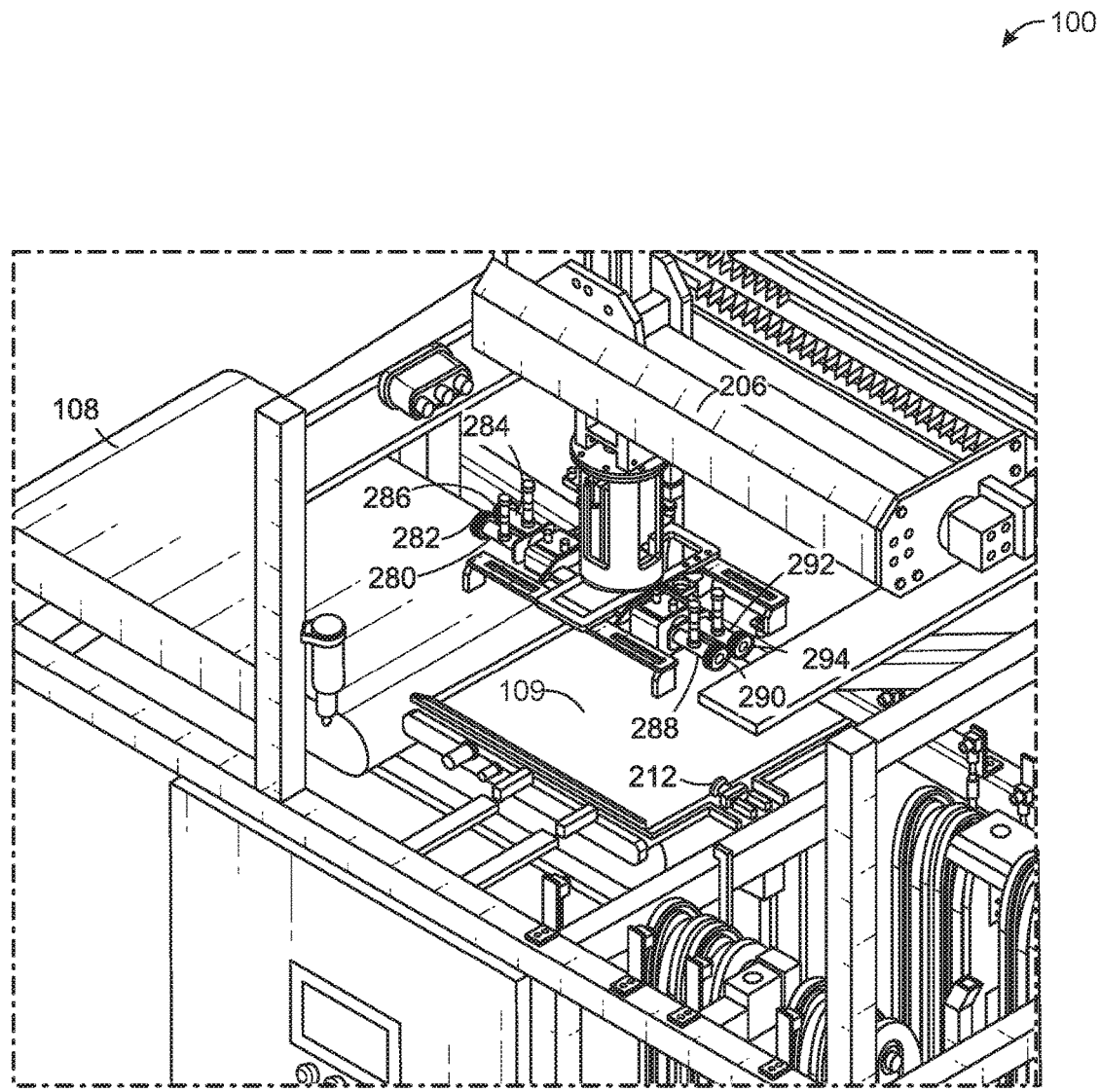
FIG. 2B illustrates a perspective view of the tote stacker machine of FIG. 1, in accordance with one or more example embodiments of the present disclosure.
Figure 2B:
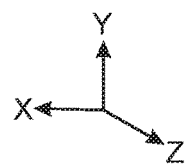

FIG. 2B illustrates a perspective view of the tote stacker machine 100 of FIG. 1, in accordance with one or more example embodiments of the present disclosure. In particular, FIG. 2B shows a more detailed view of the end effector 104.

As shown in FIG. 2B, the end effector 104 may include multiple extendable arms with vacuum suction grippers, whose function is shown and described in more detail with respect to FIG. 6A-FIG. 6D. For example, the end effector 104 may include an extendable arm 280 operatively connected to a vacuum suction gripper 282, an extendable arm 284 operatively connected to a vacuum suction gripper 286, an extendable arm 288 operatively connected to a vacuum suction gripper 290, and an extendable arm 292 operatively connected to a vacuum suction gripper 294. Although not shown, the extendable arm 280 and the extendable arm 284 may extend along the Z-axis toward the upper left corner of FIG. 2B, and the extendable arm 288 and the extendable arm 292 may extend along the Z-axis toward the lower right corner of FIG. 2B. The extension of the extendable arms is shown in FIG. 6A-FIG. 6D.

Figure 2C:
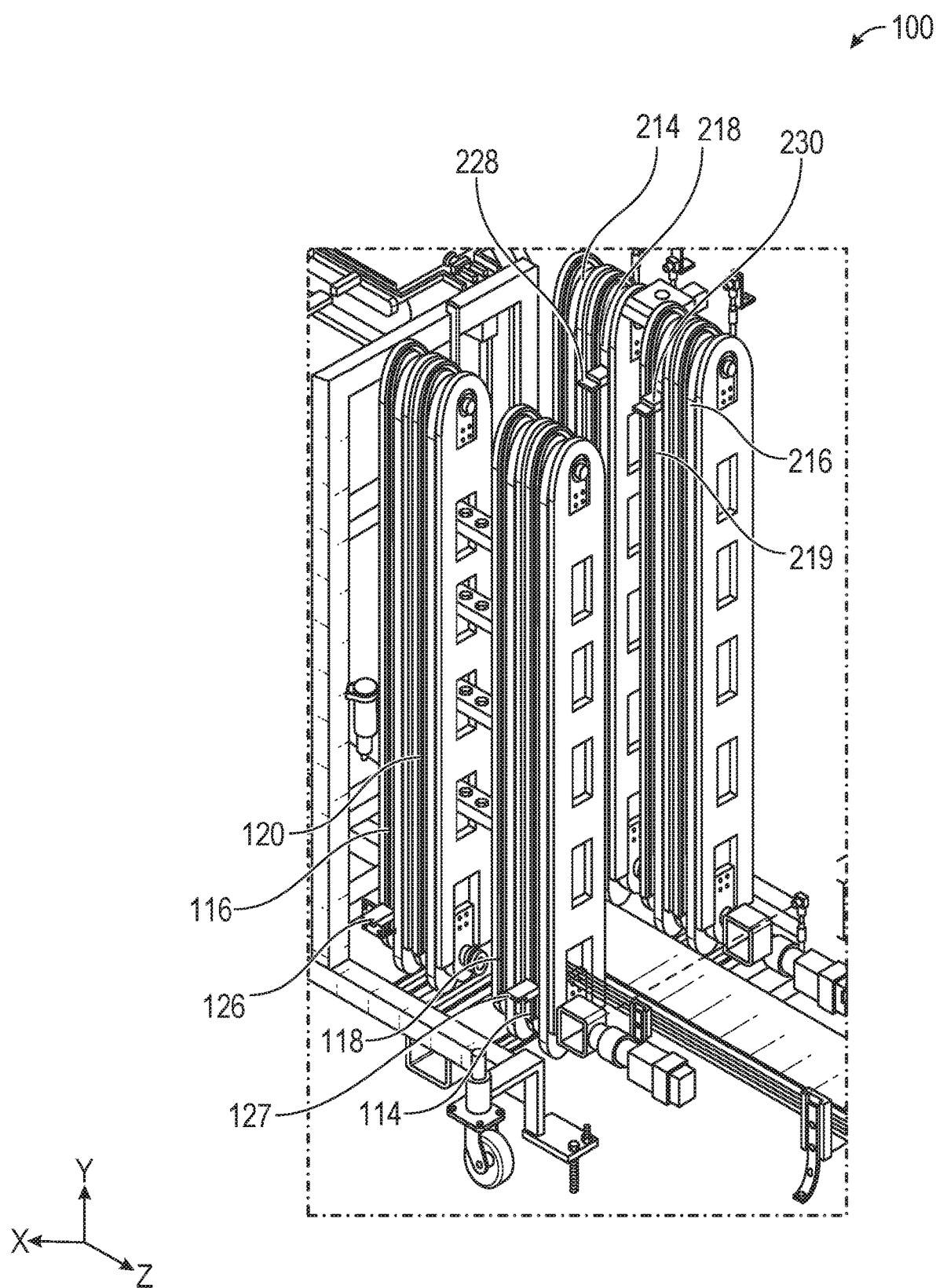
FIG. 2C illustrates a perspective view of the tote stacker machine of FIG. 1, in accordance with one or more example embodiments of the present disclosure.

FIG. 2C illustrates a perspective view of the tote stacker machine 100 of FIG. 1, in accordance with one or more example embodiments of the present disclosure. In particular, FIG. 2C shows a more detailed view of the elevator 112.

As shown in FIG. 2C, the elevator 112 may include a track 214 (e.g., corresponding to the track 116 on an opposite side of the tote stacker machine 100), a track 216 (e.g., corresponding to the track 114 on an opposite side of the tote stacker machine), a track 218 (e.g., corresponding to the track 120 on an opposite side of the tote stacker machine), a track 219 (e.g., corresponding to the track 118 on an opposite side of the tote stacker machine), a support platform 228 operatively connected to the track 218, a support platform 230 operatively connected to the track 219. While not seen in FIG. 2C, the track 120 may be operatively connected to a support platform, and the track 118 may be operatively connected to a support platform, and those support platforms may be at the same height as the support platform 228 and the support platform 230 to allow for down stacking of totes. While also not seen in FIG. 2C, the track 214 may be operatively connected to a support platform, and the track 216 may be operatively connected to a support platform, and those support platforms may be at the same height as the support platform 126 and the support platform 127 (e.g., outer support platforms), which may be on the outside of their respective tracks and upside-down (e.g., so that they rotate to right-side up as they enter the interior of the elevator 112 between the tracks on each side of the elevator 112) while the support platform 228 and the support platform 230 (e.g., inner support platforms) are inside the elevator 112, positioned right-side up to receive and support tote containers.

Referring to FIG. 2A and FIG. 2C, the tote stacker machine 100 also may include a motor 241 to cause rotation of any of the track 216 and the track 219. The motor 138 may cause rotation of any of the track 116 and the track 120. The motor 134 may cause rotation of any of the track 114 and the track 118. An unseen motor may cause rotation of any of the track 214 and the track 218.

In one or more embodiments, the tote stacker machine 100 may use any number of tracks and support platforms that may allow for totes to be down stacked and lowered on the first exit conveyor belt 130 of FIG. 1. While FIG. 2C shows eight tracks, any of which may be operatively connected to a respective support platform, the tote stacker machine 100 may use different numbers of tracks, such as four tracks, six tracks, or eight tracks. In particular, FIG. 2C shows eight tracks in multiple sets. A first track set may include the track 218 and the track 219 as inner tracks on one side of the elevator 112. A second track set may include the track 118 and the track 120 as inner tracks on the opposite side of the elevator. The first track set and the second track set may move in conjunction with one another to maintain the same respective height of the respectively connected support platforms for the first track set and the second track set. A third track set may include the track 214 and the track 216 as outer tracks on one side of the elevator 112. A fourth track set may include the track 114 and the track 116 as outer tracks on the opposite side of the elevator 112. The third track set and the fourth track set may move in conjunction with one another to maintain the same respective height of the respectively connected support platforms for the third track set and the second fourth set, and may move independently of the first track set and the second track set. In this manner, when using eight tracks, the tote stacker machine may include eight support platforms—two sets of four support platforms used to support a respective stack. When six tracks are used, the inner track sets may be combined. For example, the first track set may combine the track 218 and the track 219 into one track with a support platform, and the second track set may combine the track 118 and the track 120 into a single track set with one support platform. The third and fourth track sets may include four tracks, resulting in the use of six tracks and six support platforms. When using just four tracks, the outer track sets may need to reduce a track. For example, the track 116 and the track 216 may be used as tracks on opposite corners of the elevator 112 to support totes, or the track 214 and the track 114 may be used as tracks on opposite corners of the elevator 112 to support totes. When the use of two outer tracks is combined with the use of two inner tracks, the tote stacker machine 100 may use just four tracks and four support platforms.

In one or more embodiments, the support platforms may be steps, feet, tabs, tags, or any other element which operatively connect to and move with a respective belt or chain of a track. The support platforms may protrude from a track (e.g., perpendicular to the track) to create a platform on which a tote may be placed. By using a combination of support platforms on opposite sides of the elevator 112 (e.g., and therefore on opposite sides of a tote), the support platforms may support the weight of totes in the elevator 112. As any tote is added to a stack, the support platforms used to support the stack may be lowered (e.g., down stacking) in the elevator 112 to accommodate another tote.

Figure 3A:
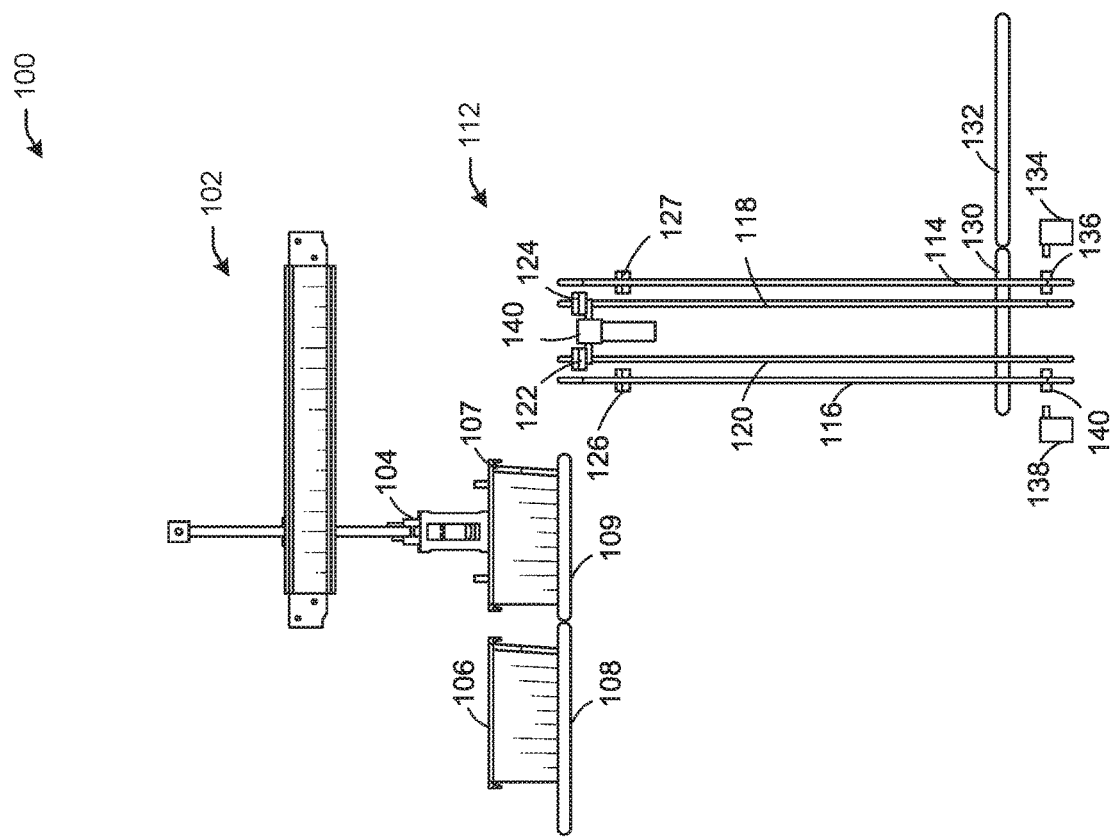
FIG. 3A illustrates an operation of the tote stacker machine of FIG. 1, in accordance with one or more example embodiments of the present disclosure.

FIG. 3A illustrates an operation of the tote stacker machine 100 of FIG. 1, in accordance with one or more example embodiments of the present disclosure.

Referring to FIG. 3A, the elevator 112 may be empty (e.g., may not have any totes). The end effector 104 may be in a first position above the conveyor belt 109, on which may be positioned the tote 107. The support platform 126 and the support platform 127 may be inside the elevator 112 proximate the top end of the elevator 112 to receive the tote 107. The support platform 122 and the support platform 124 may be outside of the elevator 112 (e.g., in front of the elevator 112 on the page), and therefore not in position to receive the tote 107.

Figure 3B:
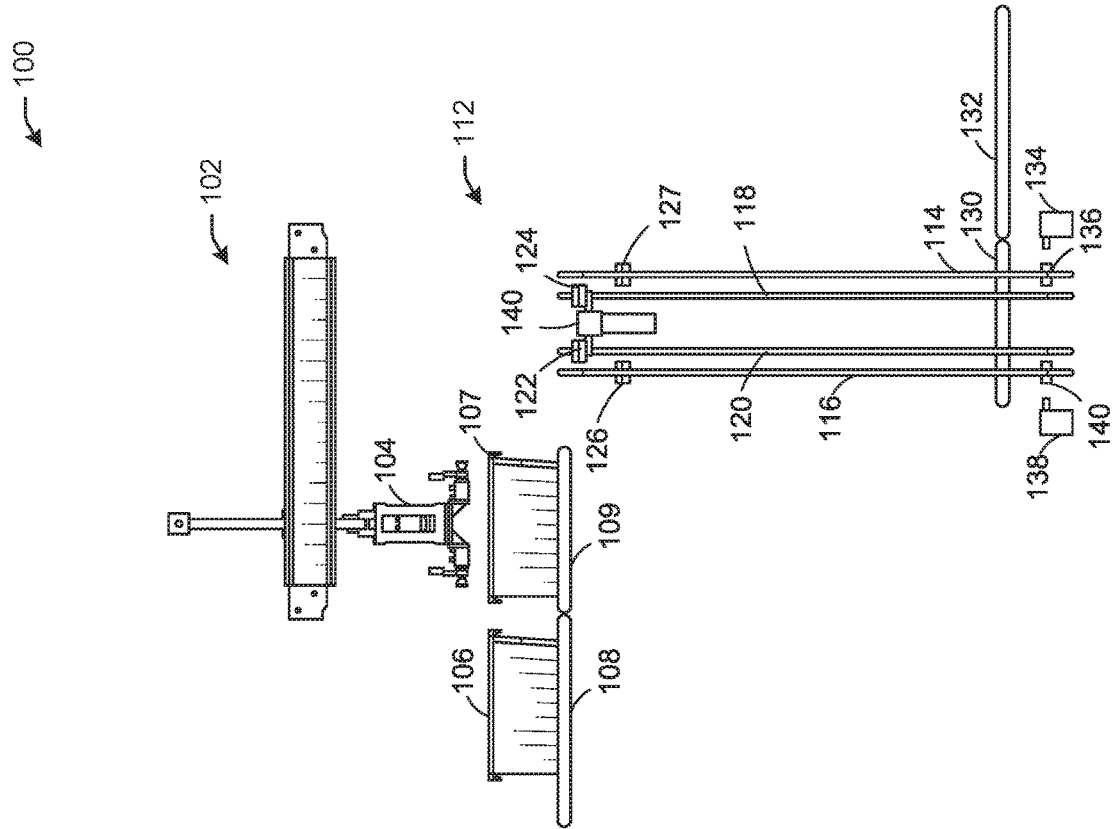
FIG. 3B illustrates an operation of the tote stacker machine of FIG. 1, in accordance with one or more example embodiments of the present disclosure.

FIG. 3B illustrates an operation of the tote stacker machine 100 of FIG. 1, in accordance with one or more example embodiments of the present disclosure.

Referring to FIG. 3B, the end effector 104 may lower its position above the conveyor belt 109 to be at least partially inside of the tote 107. As is explained further below with respect to FIG. 6A, FIG. 6B, FIG. 6C, and FIG. 6D the end effector 104 may use vacuum suction to grip the inside of the tote 107.

Figure 3C:
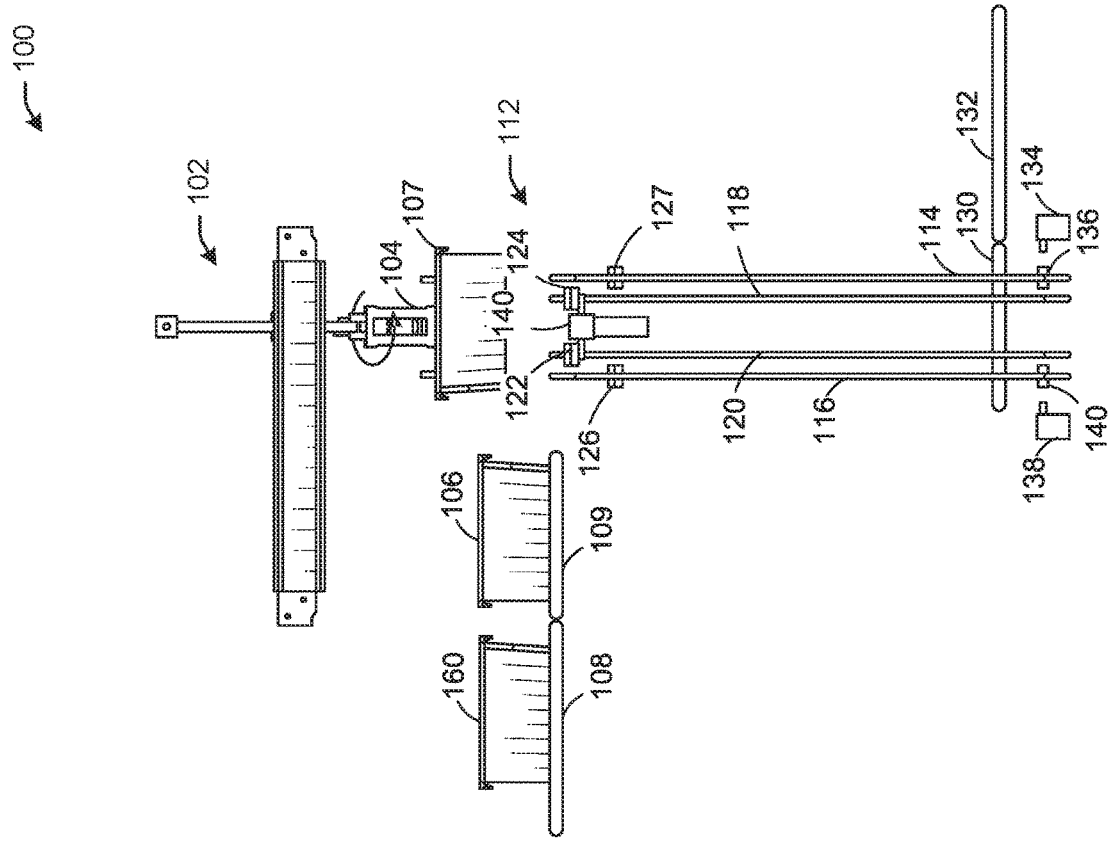
FIG. 3C illustrates an operation of the tote stacker machine of FIG. 1, in accordance with one or more example embodiments of the present disclosure.

FIG. 3C illustrates an operation of the tote stacker machine 100 of FIG. 1, in accordance with one or more example embodiments of the present disclosure.

Referring to FIG. 3C, the end effector 104, using vacuum suction, may grip and lift the tote 107 from the conveyor belt 109.

Figure 3D:
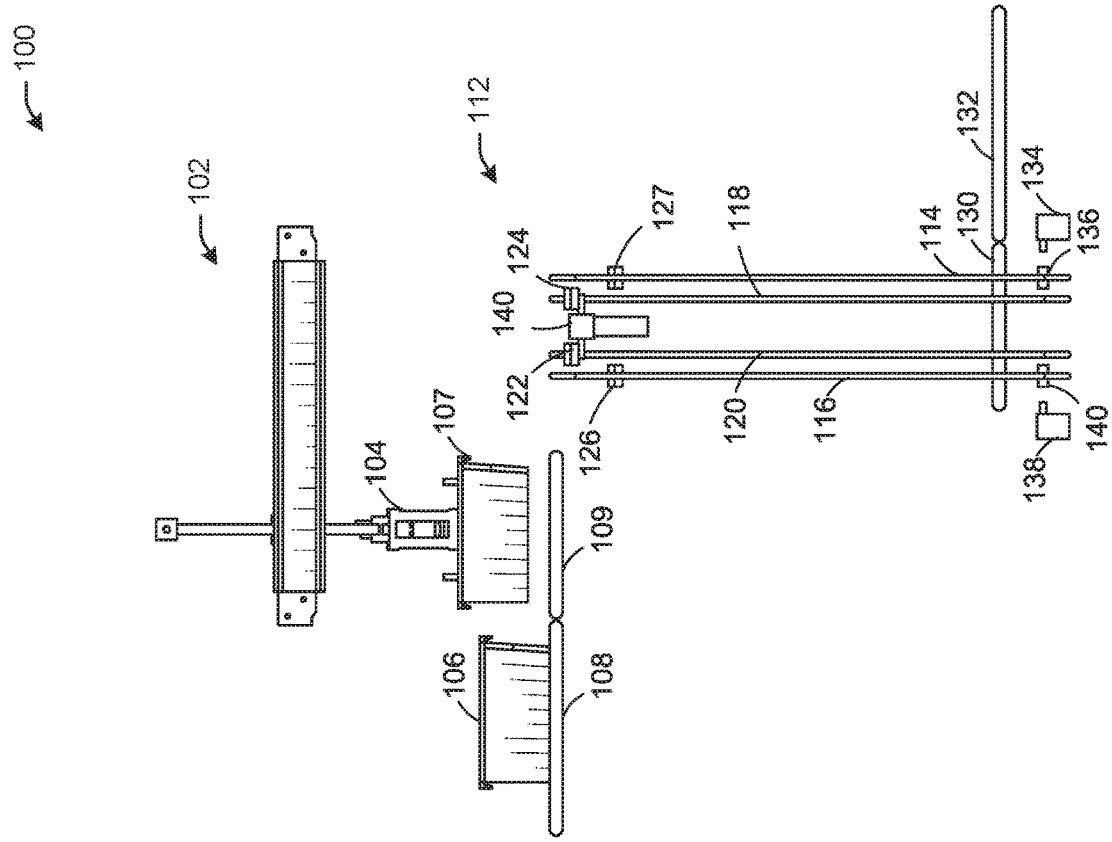
FIG. 3D illustrates an operation of the tote stacker machine of FIG. 1, in accordance with one or more example embodiments of the present disclosure.

FIG. 3D illustrates an operation of the tote stacker machine 100 of FIG. 1, in accordance with one or more example embodiments of the present disclosure.

Referring to FIG. 3D, the end effector 104 may transport the tote 107 from the conveyor belt 109 to a second position above the elevator 112. Optionally, dependent on the orientation of the tote 107 on the conveyor belt 109, the end effector 104 may rotate the tote 107 either before transporting the tote 107 to the second position above the elevator 112, while transporting the tote 107, or once the tote 107 has been positioned above the elevator 112.

Still referring to FIG. 3D, after the tote 107 has been removed from the conveyor belt 109, the tote 106 is positioned on the conveyor belt 109 using pneumatic rotation of the conveyor belt 108 and the conveyor belt 109 (e.g., and using the stopper 212 of FIG. 2A and FIG. 2B). A tote 160 may be fed onto the conveyor belt 108 to be the next tote to load onto the conveyor belt 109 once the tote 106 has been placed in the elevator 112.

FIG. 3E illustrates an operation of the tote stacker machine 100 of FIG. 1, in accordance with one or more example embodiments of the present disclosure.

Referring to FIG. 3E, the end effector 104 may lower the tote 107 into the elevator 112 and onto the support platform 126 and the support platform 127 to start a stack of totes. The support platform 126 and the support platform 127 may lower with each additional tote added to a stack (e.g., to down stack totes) as shown further herein.

FIG. 3F illustrates an operation of the tote stacker machine 100 of FIG. 1, in accordance with one or more example embodiments of the present disclosure.

Referring to FIG. 3F, the end effector 104 may release the tote 107 (e.g., by reducing the vacuum suction and/or adjusting its position as shown in further detail in FIG. 6A, FIG. 6B, FIG. 6C, and FIG. 6D). The end effector 104 may adjust vertically to be higher above the elevator 112.

FIG. 3G illustrates an operation of the tote stacker machine 100 of FIG. 1, in accordance with one or more example embodiments of the present disclosure.

Referring to FIG. 3G, a stack 150 of totes (e.g., including the tote 107 and the tote 106 of FIG. 3A) may be generated in the elevator by repeating the operations of FIG. 3A-FIG. 3F. The support platform 126 and the support platform 127 may be lower (e.g., closer to the first exit conveyor belt 130) once more totes are added to the elevator 112. A tote 152 may be the next tote positioned on the conveyor belt 109 for the elevator 112, and the following tote 154 may be on the conveyor belt 108.

FIG. 3H illustrates an operation of the tote stacker machine 100 of FIG. 1, in accordance with one or more example embodiments of the present disclosure.

Referring to FIG. 3H, the stack 150 of FIG. 3G may be lowered onto the first exit conveyor belt 130. For example, the tote stacker machine 100 may determine that the number of totes in the stack 150 in FIG. 3G has met or exceeded a threshold number of totes in a stack. The motor 134 may cause rotation of the track 114 about the pulley 136 to lower the support platform 127. The motor 138 may cause rotation of the track 116 to lower the support platform 126. When the height of the support platform 126 and the support platform 127 reaches the first exit conveyor belt 130, the stack 150 of FIG. 3G may be placed on the first exist conveyor belt 130 (e.g., the stack 150 is no longer supported by the support platform 126 and the support platform 127, which may continue to move below the first exit conveyor belt 130 to the bottom of the respective tracks and around the outside of the elevator 112).

Still referring to FIG. 3H, the end effector 104 may return to the first position above the conveyor belt 109, and may drop at least partially into the tote 152 (e.g., similar to FIG. 3B) to grip and lift the tote 152 from the conveyor belt 109.

FIG. 3I illustrates an operation of the tote stacker machine 100 of FIG. 1, in accordance with one or more example embodiments of the present disclosure.

Referring to FIG. 3I, the end effector 104 may transport the tote 152 from the first position above the conveyor belt 109 to above the elevator 112 in a second position. The support platform 122 and the support platform 124 may be rotated to be inside the elevator 112 and proximate the top end of the elevator 112 to support the tote 152 in generating a new stack while the stack 150 of FIG. 3G is being ejected from the elevator 112.

FIG. 3J illustrates an operation of the tote stacker machine 100 of FIG. 1, in accordance with one or more example embodiments of the present disclosure.

Referring to FIG. 3J, the end effector 104 may have released the tote 152 into the elevator 112 (e.g., the tote 152 may be supported by the support platform 122 and the support platform 124), and may have returned to the first position above the conveyor belt 109 to retrieve the tote 154 to add to the tote 152 to form another stack. The next tote 156 may be waiting on the conveyor belt 108.

Figure 3K:
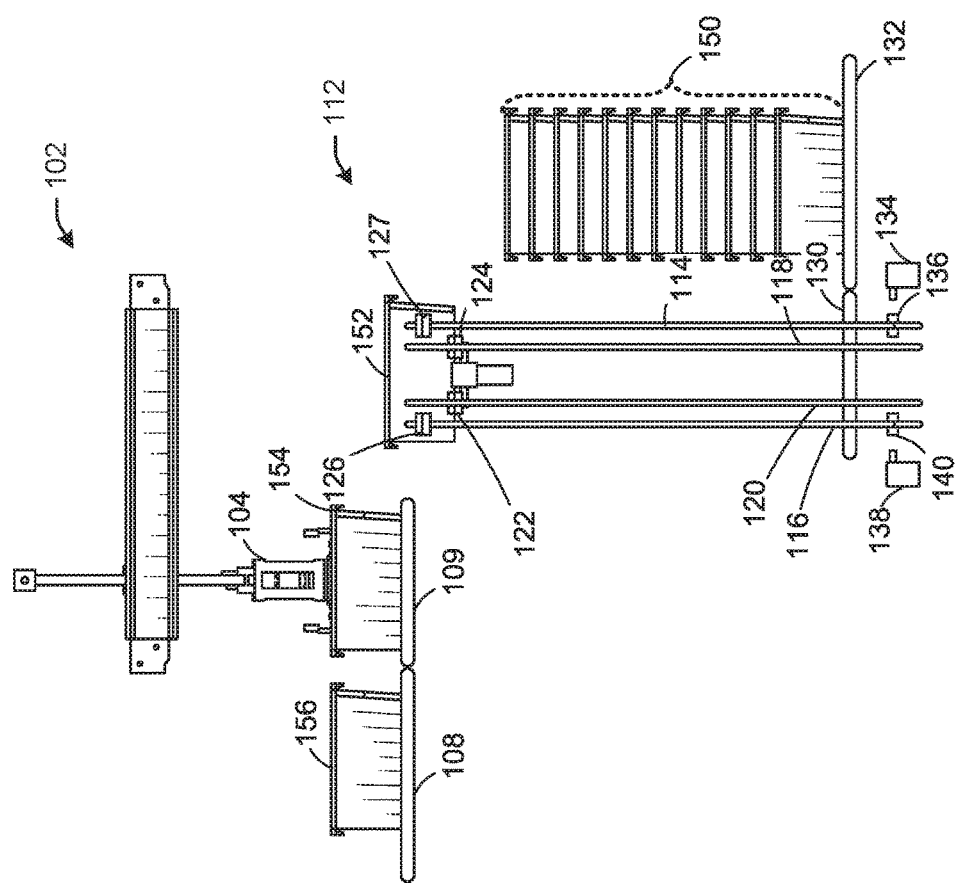
FIG. 3K illustrates an operation of the tote stacker machine of FIG. 1, in accordance with one or more example embodiments of the present disclosure.

FIG. 3K illustrates an operation of the tote stacker machine 100 of FIG. 1, in accordance with one or more example embodiments of the present disclosure.

Referring to FIG. 3K, the stack 150 may be ejected from the elevator 112 (e.g., the tote guide 234 and the tote guide 236 of FIG. 2A may move as shown in FIG. 4A and FIG. 4B to allow the stack 150 to exit the elevator 112 from the first exit conveyor belt 130 to the second exit conveyor belt 132. The tote 152 and any other totes may be in the elevator 112 to form a new stack.

FIG. 4A illustrates a front view of the tote stacker machine 100 of FIG. 1, in accordance with one or more example embodiments of the present disclosure.

Referring to FIG. 4A, a stack 410 of totes may be in the elevator 112, lowered onto the first exit conveyor belt 130 of FIG. 1. The tote guide 234 and the tote guide 236 may be in a first (e.g., closed) position that prevents the stack 410 of totes from exiting the elevator 112 (e.g., the distance between the tote guide 234 and the tote guide 236 may be smaller than the width of the stack 410). The tote guide 234 and the tote guide 236 may help maintain the stack 410 inside of the elevator 112.

Still referring to FIG. 4A, the end effector 104 may include one or more vacuum suction grippers (e.g., the vacuum suction gripper 290 and the vacuum suction gripper 294 of FIG. 2B) that may use a vacuum force to grip and lift a tote (e.g., as shown in FIGS. 3B and 3C, and further described below with respect to FIG. 6A, FIG. 6B, FIG. 6C, and FIG. 6D).

FIG. 4B illustrates a front view of the tote stacker machine 100 of FIG. 1, in accordance with one or more example embodiments of the present disclosure.

Referring to FIG. 4B, the tote guide 234 and the tote guide 236 may be in a second (e.g., "open") position that may allow the stack 410 to exit the elevator 112 (e.g., to be transported from the first exit conveyor belt 130 of FIG. 1 to the second exit conveyor belt 132 of FIG. 1). In particular, the tote guide 234 and the tote guide 236 may move laterally (e.g., along the X-axis) away from one another to generate enough separation (e.g., separation wider than the width of the stack 410) to allow the stack 410 to exit the elevator 112.

Figure 5:
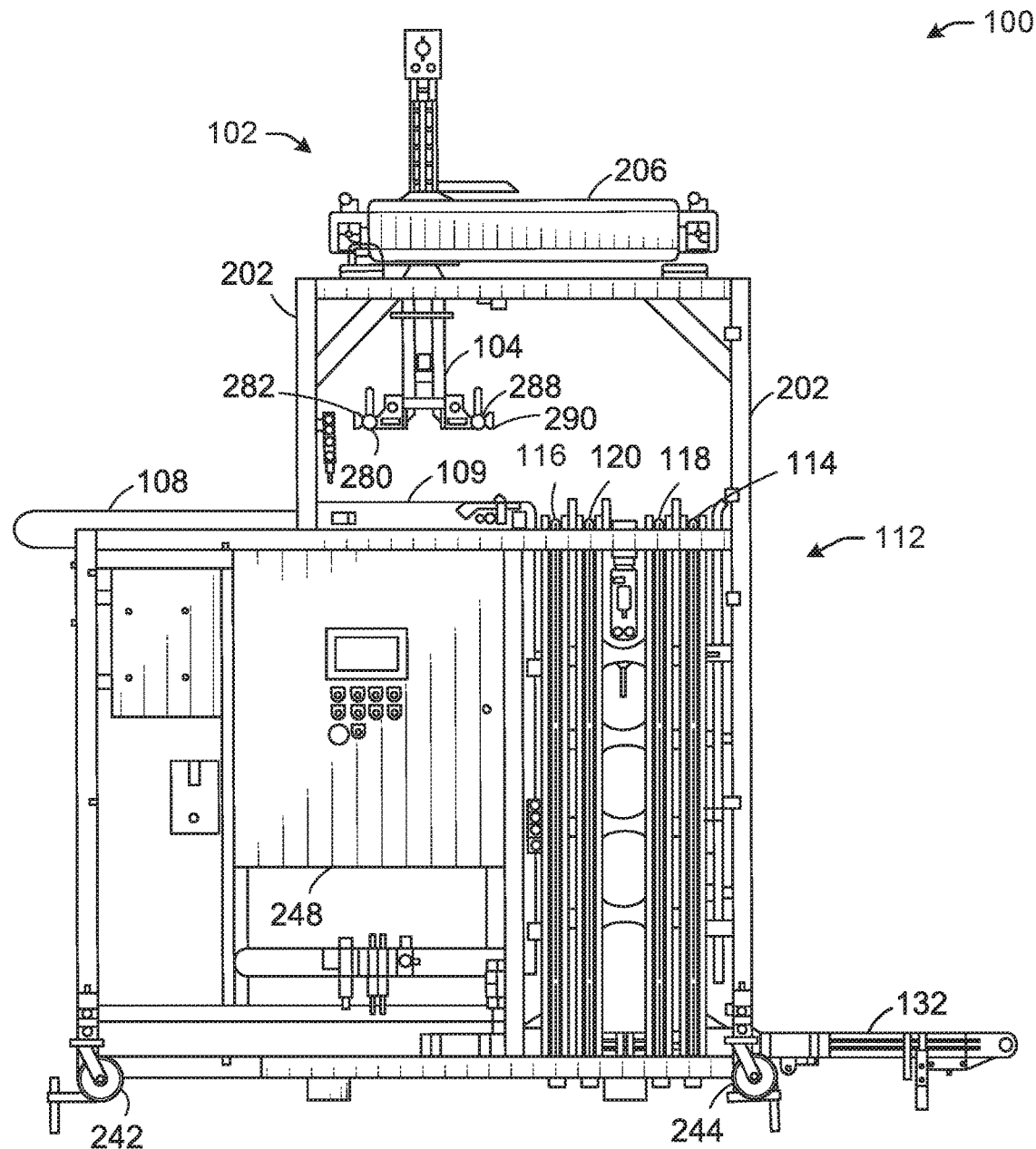
FIG. 5 illustrates a side view of the tote stacker machine of FIG. 1, in accordance with one or more example embodiments of the present disclosure.

FIG. 5 illustrates a side view of the tote stacker machine 100 of FIG. 1, in accordance with one or more example embodiments of the present disclosure.

Referring to FIG. 5, the end effector 104 may include extendable arms (e.g., the extendable arm 280 and the extendable arm 288 of FIG. 2B) on opposite sides of the end effector 104. The extendable arm 280 may be operatively connected to the vacuum suction gripper 282 of FIG. 2B, and the extendable arm 288 may be operatively connected to the vacuum suction gripper 290 of FIG. 2B. The operation of the extendable arm 280, the extendable arm 288, the vacuum suction gripper 282, and the vacuum suction gripper 290 is explained further below in FIG. 6A, FIG. 6B, FIG. 6C, and FIG. 6D.

Figure 6A:
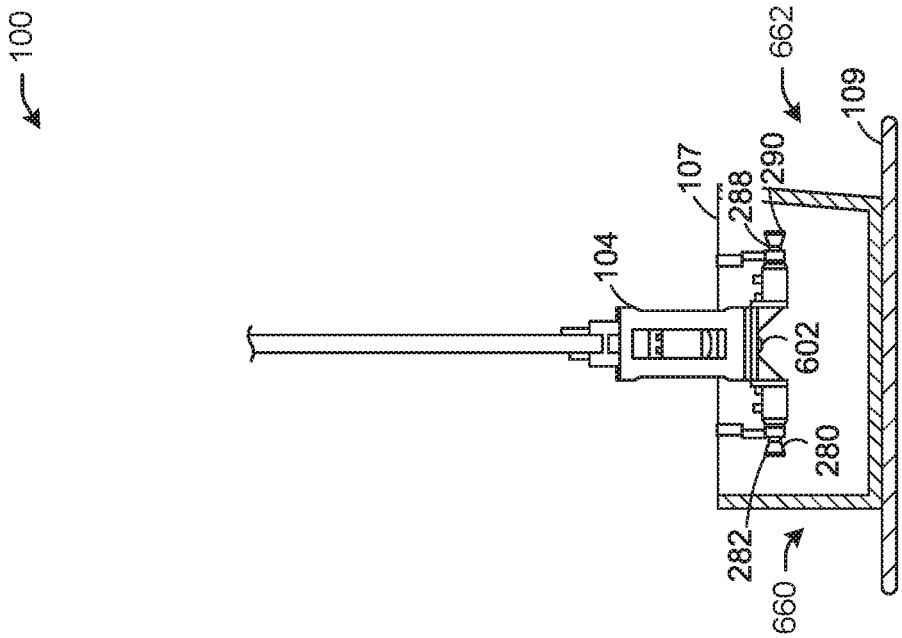
FIG. 6A illustrates a cut-away view of the tote stacker machine of FIG. 1, in accordance with one or more example embodiments of the present disclosure.

FIG. 6A illustrates a cut-away view of the tote stacker machine 100 of FIG. 1, in accordance with one or more example embodiments of the present disclosure.

Figure 6B:
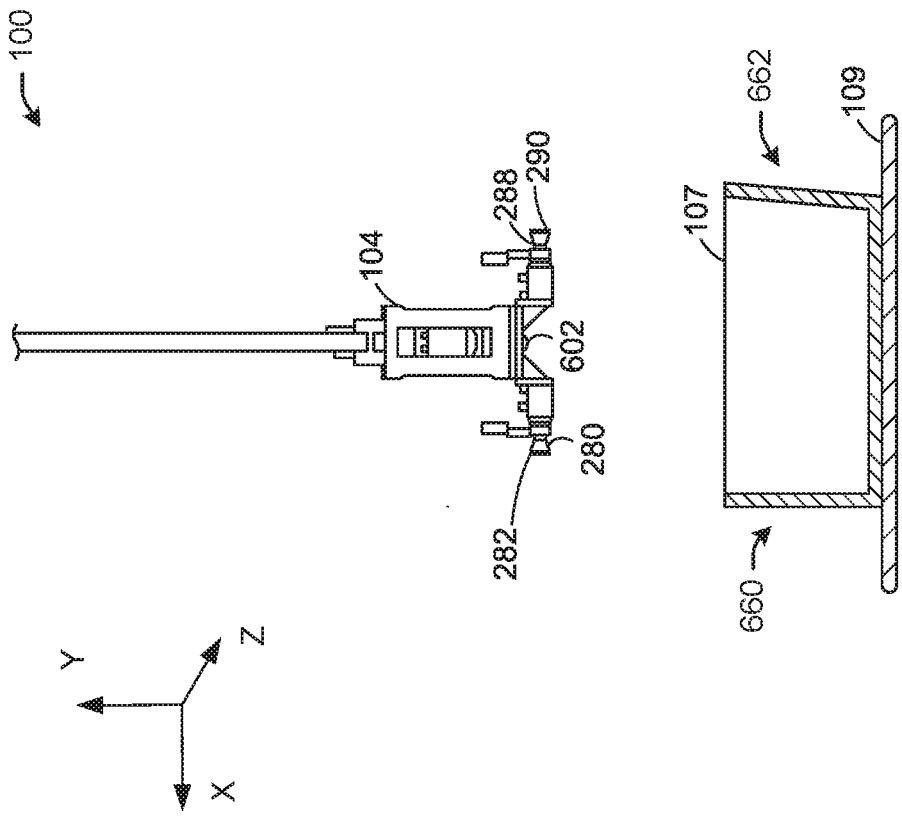
FIG. 6B illustrates a cut-away view of the tote stacker machine of FIG. 1, in accordance with one or more example embodiments of the present disclosure.

FIG. 6B illustrates a cut-away view of the tote stacker machine 100 of FIG. 1, in accordance with one or more example embodiments of the present disclosure.

Figure 6D:
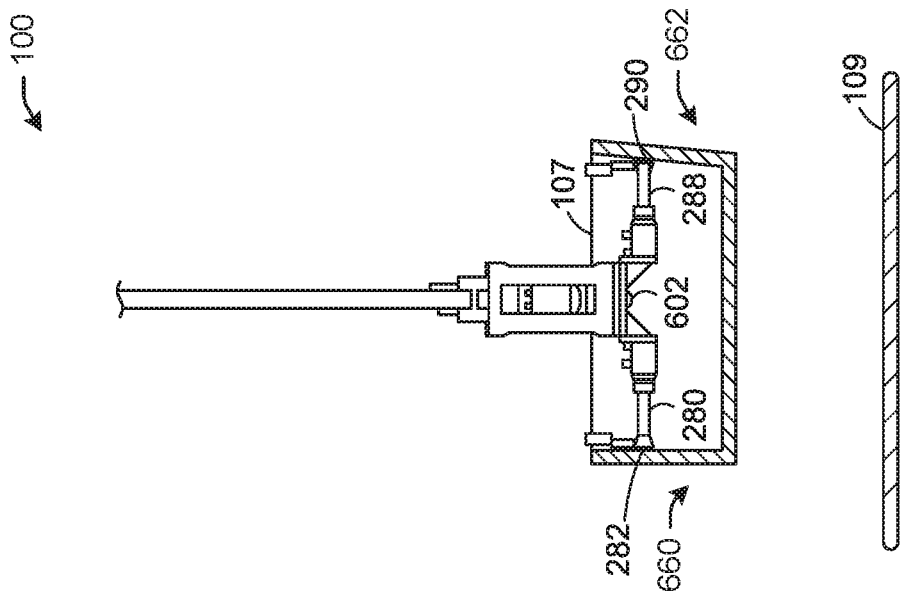
FIG. 6D illustrates a cut-away view of the tote stacker machine of FIG. 1, in accordance with one or more example embodiments of the present disclosure.
Figure 6C:
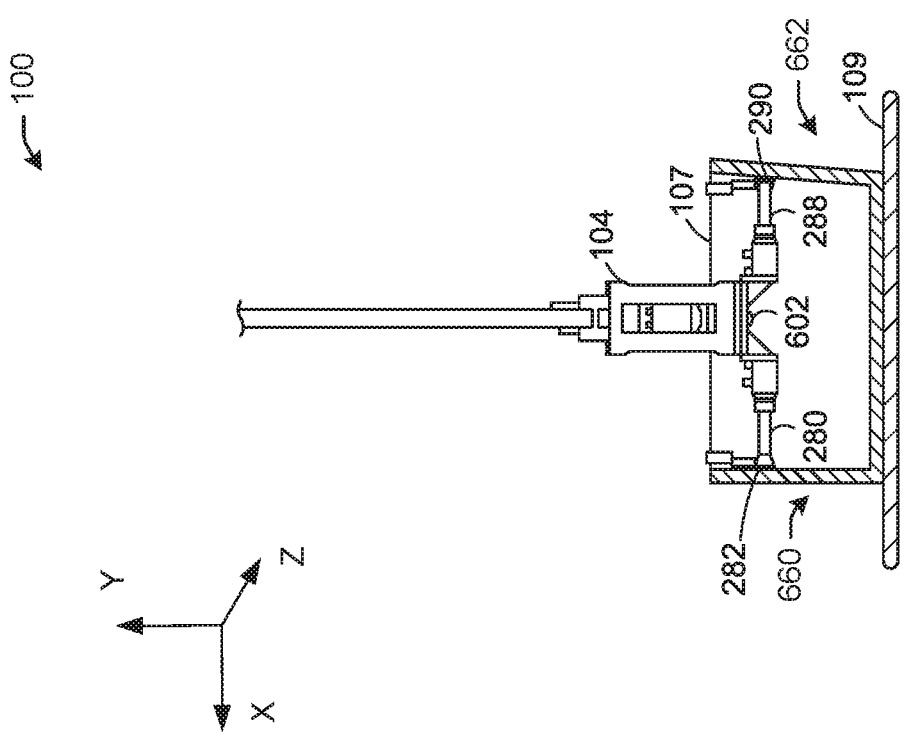
FIG. 6C illustrates a cut-away view of the tote stacker machine of FIG. 1, in accordance with one or more example embodiments of the present disclosure.

FIG. 6C illustrates a cut-away view of the tote stacker machine 100 of FIG. 1, in accordance with one or more example embodiments of the present disclosure.

FIG. 6D illustrates a cut-away view of the tote stacker machine 100 of FIG. 1, in accordance with one or more example embodiments of the present disclosure.

Referring to FIG. 6A, the tote 107 of FIG. 1 may be positioned on the conveyor belt 109 of FIG. 1 with the end effector 104 positioned above the tote 107 (e.g., corresponding to FIG. 3A). The extendable arm 280 and the extendable arm 288 of FIG. 2B may not be extended (e.g., similar to what is shown in FIG. 2B). The end effector 104 may include or be operatively connected to one or more sensors (e.g., sensor 602), which may be positioned anywhere on the end effector 104 and/or elsewhere on the tote stacker machine 100. The sensor 602 may detect sensor data indicative of the position and/or orientation of the tote 107. In particular, given the size, shape, and contours of the tote 107, the sensor data may indicate that the tote 107 is in the correct or incorrect orientation to be gripped, lifted, and placed onto a stack in the elevator 112. For example, totes may be shaped and contoured such that they may stack on one orientation, but not in another (e.g., a tote may need to be rotated 180 degrees so that it fits within another tote to form a stack). The sensor data may indicate that the contours of a tote are not what they should be (e.g., the inside of the tote 107 aligned with the sensor 602 may not be at the expected distance from the sensor 602, or the sensor 602 may capture image data that may be analyzed to determine that the tote 107 is in an improper orientation for stacking). When a tote is not in a proper orientation for stacking, but is placed on another tote for down stacking, the stack may not be stable or properly seated and the height of the stack may exceed a height threshold (e.g., as determined by sensor data captured by one or more other sensors). Such a fault may require the tote stacker machine 100 to be shut down or enter a fault mode to correct the position of totes. Thus, the sensor 602 and any other sensors may be used to capture sensor data that may indicate when the tote 107 needs to be rotated by the end effector 104 so that the tote 107 fits properly within another tote in the elevator 112 to form a stack (or so that another tote fits within the tote 107 to form a stack). When the tote 107 is placed in the elevator 112 (e.g., as shown in FIG. 3E), the extendable arm 280 and the extendable arm 288 may retract and/or the vacuum suction gripper 282 and the vacuum suction gripper 290 of FIG. 2B may reduce vacuum suction to release the tote 107.

Referring to FIG. 6B, the end effector may lower to a position at least partially within the tote 107 (e.g., corresponding to FIG. 3B). The extendable arm 280 and the extendable arm 288 of FIG. 2B may not be extended.

Referring to FIG. 6C, the end effector 104 may extend the extendable arm 280 laterally along the X-axis (or along the Z-axis of FIG. 2B) toward a first end 660 (e.g., a back end) of the tote 107, and the end effector 104 may extend the extendable arm 288 laterally along the X-axis (or along the Z-axis of FIG. 2B) in an opposite direction from the extension of the (or along the Z-axis of FIG. 2B) arm 280 toward a second end 662 (e.g., a front end) of the tote 107. When the vacuum suction gripper 290 is in contact with or close enough to the end 282, and when the vacuum suction gripper 290 is in contact with or close enough to the end 662, the force from the vacuum suction grippers may cause the end effector 104 to grip the inside of the tote 107 (along the front and back ends), allowing the end effector 104 to lift the tote 107.

Referring to FIG. 6D, the end effector 104 may lift the tote 107 from the conveyor belt 109, allowing the end effector 104 to transport the tote 107 from the conveyor belt 109 to the elevator 112 of FIG. 1 (e.g., as shown in the progression from FIG. 3C to FIG. 3D).

In one or more embodiments, the control panel 248 of FIG. 2A may include a combination of hardware and software as described further in FIG. 6, which may control the operation of the tote stacker machine 100 and its components. For example, the hardware and software of the control panel 248 may facilitate the execution of instructions that cause the end effector 104 to move, extend the extendable arm 280 and the extendable arm 288, control the vacuum suction of the vacuum suction gripper 282 and the vacuum suction gripper 290, to lift and transport totes, and to control the motors (e.g., the motor 134, the motor 138, the motor 241 of FIG. 2A) that cause rotation of the tracks (e.g., the track 114, the track 116, the track 118, the track 120, the track 214, the track 216, the track 218, the track 219 of FIG. 2C) and therefore the height and movement of the support platforms (e.g., the support platform 122, the support platform 124, the support platform 126, the support platform 127, the support platform 228, the support platform 230 of FIG. 2C) for receiving and lowering stacks of totes.

Figure 7:
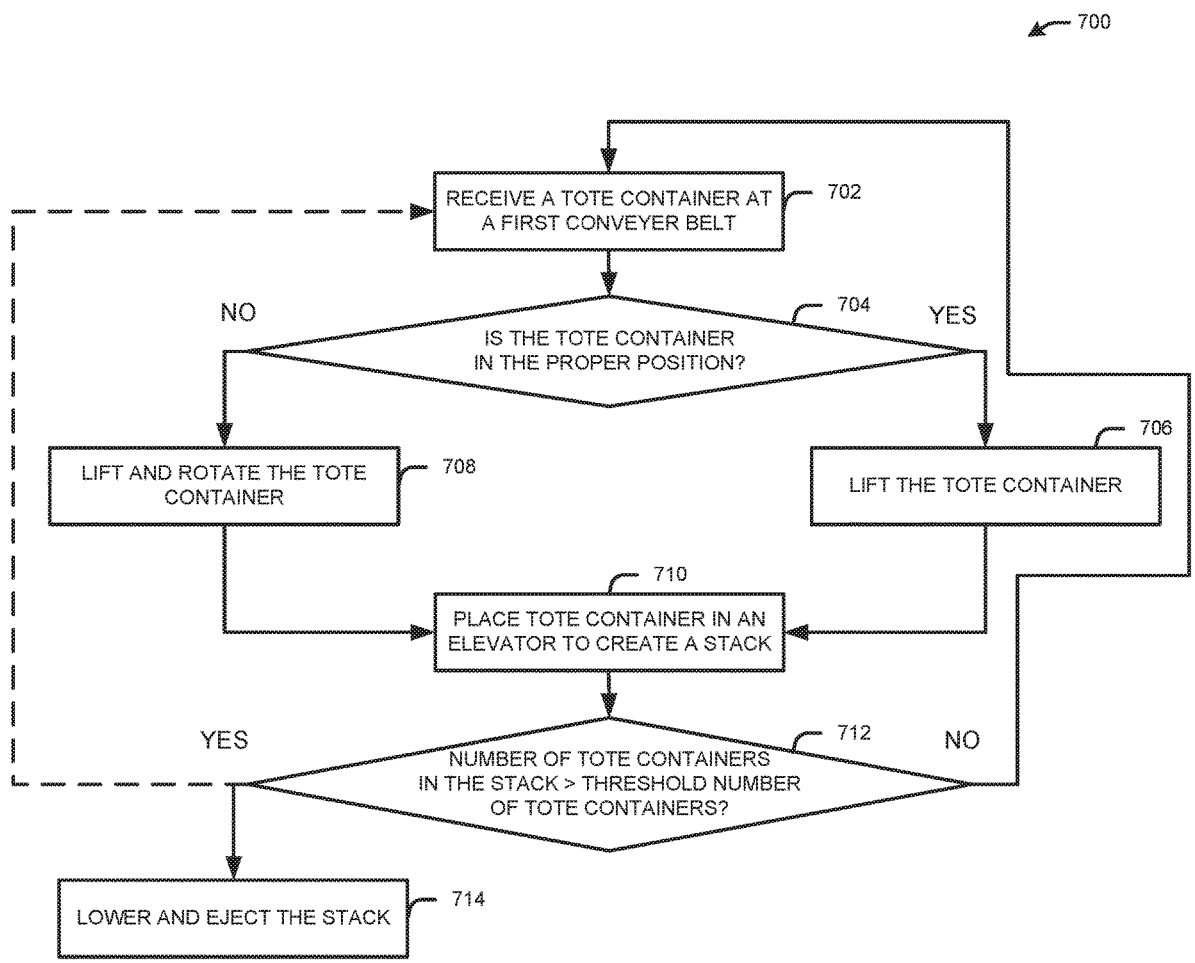
FIG. 7 illustrates a flow diagram for a process for operating the tote stacker machine of FIG. 1, in accordance with one or more example embodiments of the present disclosure.

FIG. 7 illustrates a flow diagram for a process 700 for operating the tote stacker machine of FIG. 1, in accordance with one or more example embodiments of the present disclosure.

At block 702, a first conveyor belt (e.g., the conveyor belt 109 as shown in FIG. 3A) of a tote stacker machine (e.g., the tote stacker machine 100 of FIG. 3A) may receive and move a tote container (e.g., the tote 107 from FIG. 3A). The tote container may be received from the conveyor belt 108 of FIG. 3A using pneumatic rolling. The stopper 212 of FIG. 2A and FIG. 2B may be used to position the tote container on the first conveyor belt by preventing the tote container from rolling too far or not rolling far enough (e.g., the stopper 212 may use vacuum suction to pull the tote container) to be positioned underneath an end effector (e.g., the end effector 104 of FIG. 3A).

At block 704, the tote stacker machine may determine whether the tote container is in a proper position and/or orientation to be gripped and lifted from the first conveyor belt. The tote stacker machine may include one or more sensors (e.g., the sensor 602 of FIG. 6A, FIG. 6B, FIG. 6C, and FIG. 6D). The one or more sensors may capture sensor data that may be analyzed by the tote stacker machine to determine whether the tote container is in a proper position (e.g., relative to the stopper 212 of FIG. 2A and FIG. 2B) and/or orientation (e.g., whether the "front" end of a tote is proximate to the stopper 212 of FIG. 2A and FIG. 2B or whether the "back" end of a tote is proximate the stopper 212 of FIG. 2A and FIG. 2B) for down stacking in an elevator (e.g., the elevator 112 of FIG. 3A). The sensor data may include image data, radar data, LIDAR data, infrared data, and the like to determine whether the tote is in an expected position or needs to be re-positioned and/or re-oriented for down stacking. When the tote stacker machine determines that the tote container is in the proper position for down stacking, the process 700 may continue to block 706. When the tote stacker machine determines that the tote is not in the proper position for down stacking, the process 700 may continue to block 708.

At block 706, the tote stacker machine may lift the tote container from the first conveyor belt (e.g., a first position) and, without rotating the tote container, at block 710 may transport and place the tote container in an elevator to form a stack (e.g., the progression from FIG. 3C to FIG. 3D to FIG. 3E without any rotation).

At block 708, the tote stacker machine may lift the tote container from the first conveyor belt (e.g., a first position), may rotate the tote container, and at block 710 may transport and place the rotated tote container in an elevator to form a stack (e.g., the progression from FIG. 3C to FIG. 3D to FIG. 3E with rotation).

At block 712, the tote stacker machine may determine whether the number of tote containers in a stack in the elevator exceeds a threshold number of totes. The threshold number of totes for a stack may define the number of totes to include in a stack before the stack is lowered and ejected from the elevator. The threshold number of totes in a stack may be adjustable (e.g., using the control panel 248 of FIG. 2A). The tote stacker machine may maintain a count of totes in a stack based on the number of times that the end effector transports a tote from the first position to the second position in the elevator. The count may increment with each such operation, and may reset when the count exceeds the threshold number of totes and the totes are lowered and ejected. When the number of tote containers in a stack in the elevator has not exceeded the threshold number of totes, the process 700 may return to block 702 to receive another tote for the stack. When the number of tote containers in a stack in the elevator has exceeded the threshold number of totes, the process 700 may continue to block 714, where the tote stacker machine may lower and eject the stack (e.g., the progression from FIG. 3H to FIG. 3I to FIG. 3J to FIG. 3K). While the stack is being ejected, the process 700 optionally may proceed to block 702 to receive another tote to begin a new stack (e.g., the progression from FIG. 3H to FIG. 3I to FIG. 3J to FIG. 3K).

Figure 8:
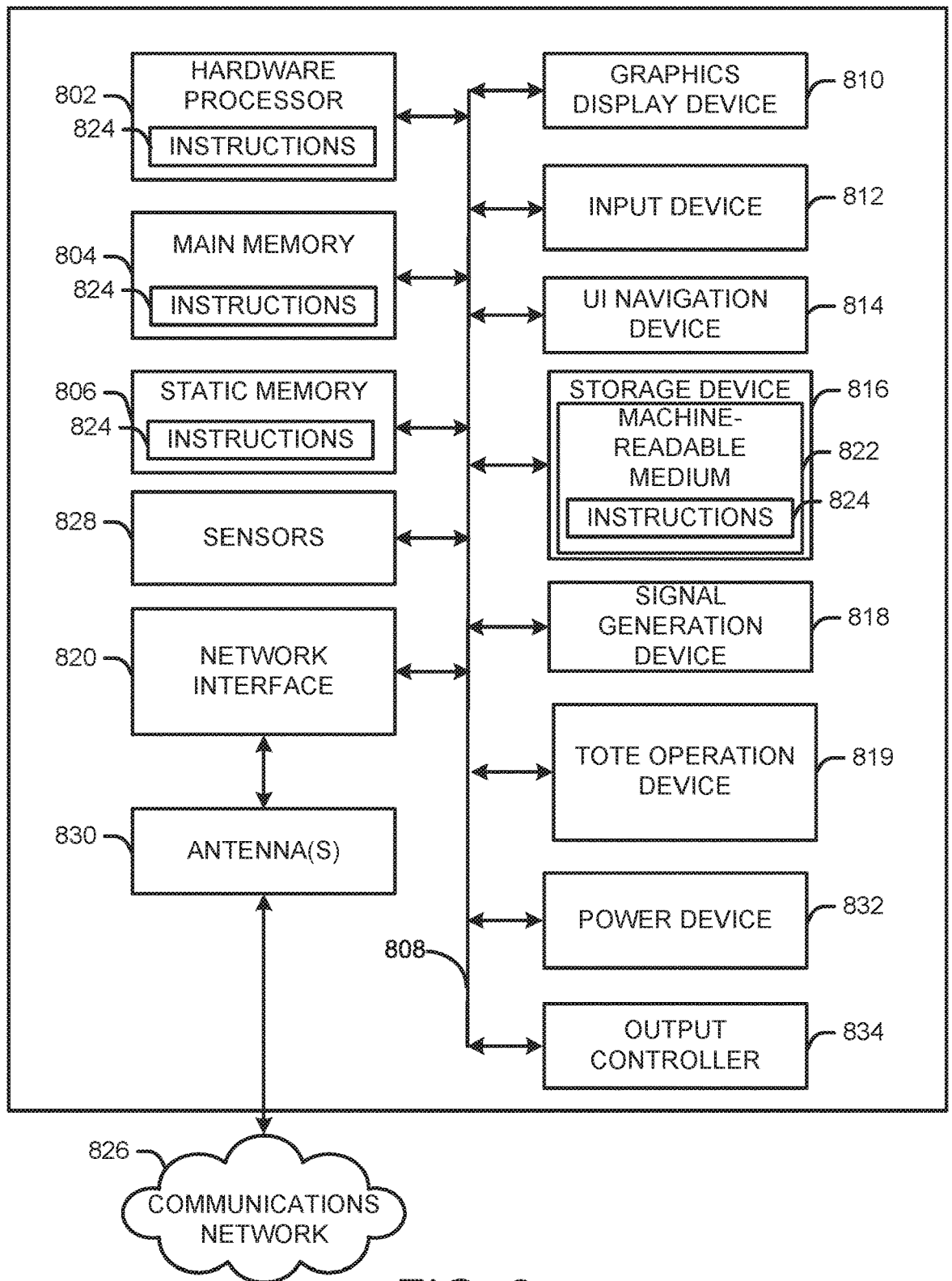
FIG. 8 illustrates a block diagram of an example machine upon which any of one or more techniques (e.g., methods) used to control the tote stacker machine of FIG. 1 may be performed, in accordance with one or more example embodiments of the present disclosure.

FIG. 8 illustrates a block diagram of an example machine 800 upon which any of one or more techniques (e.g., methods) used to control the tote stacker machine 100 of FIG. 1 may be performed, in accordance with one or more example embodiments of the present disclosure.

In other embodiments, the machine 800 may operate as a standalone device or may be connected (e.g., networked) to other machines. The machine 800 may be a server, a personal computer (PC), a smart home device, a tablet PC, a set-top box (STB), or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein.

In some embodiments, the machine 800 may represent the control panel 248 of FIG. 2A to control operation of the tote stacker machine 100 as described further herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard or keypad as shown on the control panel 248 of FIG. 2A), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818, a tote operation device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The tote operation device 819 may carry out or perform any of the operations and processes (e.g., the progression of FIG. 3A-FIG. 3K, process 700 of FIG. 7) described and shown above.

In one or more embodiments, the tote operation device 819 may cause a first conveyor belt (e.g., the conveyor belt 109 as shown in FIG. 3A) of a tote stacker machine (e.g., the tote stacker machine 100 of FIG. 3A) to receive and move a tote container (e.g., the tote 107 from FIG. 3A). The tote container may be received from the conveyor belt 108 of FIG. 3A using pneumatic rolling. The tote operation device 819 may cause the stopper 212 of FIG. 2A and FIG. 2B to position the tote container on the first conveyor belt by preventing the tote container from rolling too far or not rolling far enough (e.g., the stopper 212 may use vacuum suction to pull the tote container) to be positioned underneath an end effector (e.g., the end effector 104 of FIG. 3A). For example, the tote operation device 819 may cause execution of computer instructions that cause the first conveyor to receive and move the tote container.

In one or more embodiments, the tote operation device 819 may determine whether the tote container is in a proper position to be gripped and lifted from the first conveyor belt. The tote stacker machine may include one or more sensors (e.g., the sensor 602 of FIG. 6A, FIG. 6B, FIG. 6C, and FIG. 6D). The one or more sensors may capture sensor data that may be analyzed by the tote operation device 819 to determine whether the tote container is in a proper position for down stacking in an elevator (e.g., the elevator 112 of FIG. 3A). The sensor data may include image data, radar data, LIDAR data, infrared data, and the like to determine whether the tote is in an expected position or needs to be re-positioned and/or re-oriented for down stacking. For example, the tote operation device 819 may cause execution of computer instructions that cause the one or more sensors to detect sensor data and to determine, based on the sensor data, whether the tote container needs to be rotated for down stacking.

In one or more embodiments, the tote operation device 819 may cause the end effector 104 to lift the tote container from the first conveyor belt (e.g., a first position) and, without rotating the tote container, may cause the end effector 104 to transport and place the tote container in an elevator to form a stack (e.g., the progression from FIG. 3C to FIG. 3D to FIG. 3E without any rotation). For example, the tote operation device 819 may cause execution of computer instructions that cause the end effector 104 to lift and move the tote container.

In one or more embodiments, the tote operation device 819 may cause the end effector 104 to lift the tote container from the first conveyor belt (e.g., a first position), rotate the tote container, and to transport and place the tote container in an elevator to form a stack (e.g., the progression from FIG. 3C to FIG. 3D to FIG. 3E with any rotation). For example, the tote operation device 819 may cause execution of computer instructions that cause the end effector 104 to lift and move the tote container.

In one or more embodiments, the tote operation device 819 may determine whether the number of tote containers in a stack in the elevator exceeds a threshold number of totes. The threshold number of totes for a stack may define the number of totes to include in a stack before the stack is lowered and ejected from the elevator. The threshold number of totes in a stack may be adjustable (e.g., using the control panel 248 of FIG. 2A). The tote stacker machine may maintain a count of totes in a stack based on the number of times that the end effector transports a tote from the first position to the second position in the elevator. The count may increment with each such operation, and may reset when the count exceeds the threshold number of totes and the totes are lowered and ejected. The tote operation device 819 may, when the totes have been lowered in the elevator onto the first exit conveyor belt 130 of FIG. 1, cause the tote guide 234 and the tote guide 236 to open (e.g., the progression from FIG. 4A to FIG. 4B) to allow for ejection of the totes from the elevator 112.

It is understood that the above are only a subset of what the tote operation device 819 may be configured to perform and that other functions included throughout this disclosure may also be performed by the tote operation device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a first conveyor belt;
a stopper configured to stop a first tote on the first conveyor belt;
a first sensor configured to determine a first orientation of the first tote on the first conveyor belt;
a t-bot gantry;
a rotatable end effector operatively connected to the t-bot gantry, the rotatable end effector configured to move in a lateral direction between a first position aligned with the first conveyor belt and a second position, the rotatable end effector having a suction gripper that grips the first tote, and the rotatable end effector configured to rotate the first tote from the first orientation to a second orientation;
an elevator that is aligned with the second position and includes a first track and a second track, the first track operatively connected to a first platform, the second track operatively connected to a second platform, the elevator configured to receive between the first track and the second track, using one of the first platform or the second platform, the first tote from the rotatable end effector and to down stack the first tote with a second tote;

a second sensor operatively connected to the elevator and configured to determine sensor data indicating that the first tote is improperly seated in the second tote; and a second conveyor belt at least partially positioned between the first track and the second track of the elevator, the second conveyor belt configured to move the first tote and the second tote away from the elevator.

2. The system of claim 1, wherein the first sensor determines second sensor data indicative of the first orientation of the first tote on the first conveyor belt, and wherein the rotatable end effector is configured to rotate the first tote from the first orientation to the second orientation based on the second sensor data.

3. The system of claim 1, further comprising:
a first track set;
a second track set, the first track set comprising the first track and a third track, the second track set comprising the second track and a fourth track, the first track set positioned on a first side of the elevator, the second track set positioned on a second side of the elevator opposite the first side, wherein the first track set and the second track set are configured to lower first tote with the second tote to the second conveyor belt;
a fifth track; and
a sixth track, wherein the fifth track and the sixth track move independently from the first track set and the second track set.

4. The system of claim 3, wherein the elevator is configured to receive the first tote using the first platform and the second platform at a third position proximate to the first conveyor belt, wherein the elevator is configured to down stack the first tote with the second tote onto the second conveyor belt using the first platform and the second platform at a fourth position below the third position and proximate to the second conveyor belt, and wherein the elevator is configured to receive, using a fourth platform operatively connected to the fourth track and a fifth platform operatively connected to the fifth track, in the third position, a third tote.

5. A system comprising:
a first conveyor belt;
a first sensor configured to determine an orientation of a first tote on the first conveyor belt;
an end effector that moves between a first position aligned with the first conveyor belt and a second position;
an elevator that is aligned with the second position and that includes a first track and a second track, the elevator configured to receive the first tote from the end effector and to down stack the first tote with a second tote;
a second sensor operatively connected to the elevator and configured to determine sensor data indicating that the first tote is improperly seated in the second tote; and
a second conveyor belt at least partially positioned between the first track and the second track of the elevator, the second conveyor belt configured to move the first tote and second tote away from the elevator.

6. The system of claim 5, wherein the first sensor is a laser sensor that determines second sensor data indicative of the orientation of the first tote on the first conveyor belt, and wherein the end effector is configured to rotate the first tote from the orientation to a second orientation based on the sensor data.

7. The system of claim 5, further comprising a first track set and a second track set, the first track set comprising the first track and a third track, the second track set comprising the second track and a fourth track, the first track set positioned on a first side of the elevator, the second track set positioned on a second side of the elevator opposite the first side, and wherein the first track set and the second track set are configured to lower first tote with the second tote to the second conveyor belt.

8. The system of claim 7, further comprising a fifth track and a sixth track, wherein the fifth track and the sixth track move independently from the first track set and the second track set.

9. The system of claim 7, the first track operatively connected to a first platform, the second track operatively connected to a second platform, the third track operatively connected to a third platform, the fourth track operatively connected to a fourth platform, and wherein the elevator is configured to down stack the first tote with the second tote using the first platform, the second platform, the third platform, and the fourth platform.

10. The system of claim 9, wherein the elevator is configured to receive the first tote using the first platform, the second platform, the third platform, and the fourth platform at a third position proximate to the first conveyor belt, wherein the elevator is configured to down stack the first tote with the second tote onto the second conveyor belt at a fourth position below the third position and proximate to the second conveyor belt.

11. The system of claim 10, wherein the elevator is configured to receive a third tote at the third position while the first tote and the second tote are at the fourth position.

12. The system of claim 5, wherein the end effector is a rotatable end effector comprising a suction gripper, the system further comprising a gantry operatively connected to the rotatable end effector.

13. The system of claim 5, further comprising a stopper configured to stop a first tote on the first conveyor belt using vacuum suction.

14. The system of claim 5, the elevator further comprising a tote guide that is movable between a third position configured to prevent removal of the first tote and the second tote from the elevator by the second conveyor belt and a fourth position that allows the removal of the first tote and the second tote from the elevator by the second conveyor belt.

15. The system of claim 5, wherein the end effector comprises an extendable arm, wherein a suction gripper is operatively connected to the extendable arm, and wherein the extendable arm is configured to move from a third position to a fourth position, the fourth position operatively connecting the suction gripper to the first tote.

16. A method, comprising:
moving a first tote using a first conveyor belt;
determining first sensor data, based on a first sensor, indicative of an orientation of the first tote on the first conveyor belt;
determining, based on the first sensor data, a rotation of the first tote;
gripping, using a suction gripper of an end effector, the first tote;
moving, using the end effector and based on the rotation, the first tote between a first position aligned with the first conveyor belt and a second position;
receiving, at an elevator, the first tote, wherein the elevator is aligned with the second position, and wherein the elevator comprises a first track and a second track;

causing the first track and the second track to down stack the first tote with a second tote;

determining second sensor data, based on a second sensor operatively connected to the elevator, second sensor data indicating that the first tote is improperly seated in the second tote;

receiving, by a second conveyor belt at least partially positioned between the first track and the second track of the elevator, the first tote and the second tote; and moving the first tote and the second tote away from the elevator using the second conveyor belt.

17. The method of claim 16, wherein determining the rotation comprises determining that the first tote is positioned in a first orientation, and wherein moving the first tote comprises rotating the first tote from the first orientation to a second orientation.

18. The method of claim 16, wherein the first tote is received by a first support platform operatively connected to the first track and a second support platform operatively connected to the second track, and wherein causing the first track and the second track to down stack the first tote comprises lowering the first support platform and the second support platform.

19. The method of claim 16, further comprising receiving, using a third support platform operatively connected to a third track and a fourth support platform operatively connected to a fourth track, a third tote.

* * * * *